(12) United States Patent (10) Patent No.: US 12,566,746 B2

Jernigan, IV (45) **Date of Patent: \*Mar. 3, 2026**

(54) INTEGRATING CHANGE TRACKING OF STORAGE OBJECTS OF A DISTRIBUTED OBJECT STORAGE DATABASE INTO A DISTRIBUTED STORAGE SYSTEM

(71) Applicant: NetApp, Inc., San Jose, CA (US)

(72) Inventor: Richard Parvin Jernigan, IV, Sewickley, PA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,072

(22) Filed: Dec. 4, 2023

(65) Prior Publication Data

US 2024/0104081 A1 Mar. 28, 2024

Related U.S. Application Data

(63) Continuation of application No. 17/728,708, filed on Apr. 25, 2022, now Pat. No. 11,868,334.

(Continued)

(51) Int. Cl.
*G06F 16/00* (2019.01)
*G06F 16/18* (2019.01)
(Continued)

(52) U.S. Cl.
CPC ...... *G06F 16/2308* (2019.01); *G06F 16/1805* (2019.01); *G06F 16/182* (2019.01);
(Continued)

(58) Field of Classification Search
CPC .... G06F 16/2308; G06F 16/27; G06F 16/182; G06F 16/22; G06F 16/285; G06F 16/2358; G06F 16/1805; H04L 45/02; H04L 45/30

See application file for complete search history.

(56) References Cited

U.S. PATENT DOCUMENTS 6,353,834 B1 * 3/2002 Wong ...................... H04L 69/22
707/823
6,704,885 B1 * 3/2004 Salas-Meza ............ H04L 67/55
714/E11.124

(Continued)

FOREIGN PATENT DOCUMENTS

WO 9905586 A2 2/1999
WO WO2000050999 A1 * 2/2000

(Continued)

OTHER PUBLICATIONS

Haroun Benkaouha, "A stable storage in MANET: Replication or distributed storage", Journal of Computational Science, vol. 45, Sep. 2020, pp. 1-9.*

(Continued)

*Primary Examiner* — Srirama Channavajjala
(74) *Attorney, Agent, or Firm* — Jaffery Watson Hamilton & DeSanctis

(57) ABSTRACT

In one embodiment, distributed data storage systems and methods integrate a change tracking manager with scalable databases. According to one embodiment, a computer implemented method comprises integrating change tracking of storage objects into the distributed object storage database that includes a first database of a first type and one or more chapter databases of a second type with the distributed object storage database supporting a primary lookup index and a secondary lookup index in order to locate a storage object. The method includes recording in a header of a chapter database a network topology for connecting a bucket having the chapter database to a first peer bucket when a new mirror to the first peer bucket is being established, and recording a first directive into the header of the chapter database to express a type of content to be mirrored from the bucket to the first peer bucket.

17 Claims, 21 Drawing Sheets

Related U.S. Application Data

(60) Provisional application No. 63/275,135, filed on Nov. 3, 2021.

(51) Int. Cl.

| | |
|---|---|
| *G06F 16/182* | (2019.01) |
| *G06F 16/22* | (2019.01) |
| *G06F 16/23* | (2019.01) |
| *G06F 16/27* | (2019.01) |
| *G06F 16/28* | (2019.01) |
| *H04L 45/02* | (2022.01) |
| *H04L 45/30* | (2022.01) |

(52) U.S. Cl.
CPC .......... *G06F 16/22* (2019.01); *G06F 16/2358* (2019.01); *G06F 16/27* (2019.01); *G06F 16/285* (2019.01); *H04L 45/02* (2013.01); *H04L 45/30* (2013.01)

(56) References Cited

U.S. PATENT DOCUMENTS

| | | | |
|---|---|---|---|
| 6,728,879 | B1 | 4/2004 | Atkinson |
| 9,286,612 | B2 * | 3/2016 | Frankland ............. G06F 16/951 |
| 9,767,187 | B2 | 9/2017 | Hoyne et al. |
| 9,916,134 | B2 * | 3/2018 | Charisius .................. G06F 8/20 |
| 10,146,833 | B1 * | 12/2018 | Muniswamy Reddy .................... G06F 16/24539 |
| 10,896,200 | B1 * | 1/2021 | Krishnan ............ H04L 67/1034 |
| 11,341,171 | B2 | 5/2022 | Mack |
| 11,868,334 | B2 | 1/2024 | Jernigan, IV |
| 12,079,193 | B2 | 9/2024 | Jernigan, IV |
| 2004/0103206 | A1 * | 5/2004 | Hsu ..................... H04L 67/1097 709/230 |
| 2008/0022054 | A1 | 1/2008 | Hertzberg et al. |
| 2010/0198888 | A1 | 8/2010 | Blomstedt et al. |
| 2010/0333116 | A1 * | 12/2010 | Prahlad .................. G06Q 30/02 713/153 |
| 2011/0065082 | A1 | 3/2011 | Gal et al. |
| 2011/0072022 | A1 | 3/2011 | Tardif |
| 2013/0295535 | A1 | 11/2013 | Levy et al. |
| 2013/0318229 | A1 * | 11/2013 | Bakre .................. G06F 16/172 709/224 |
| 2016/0292049 | A1 * | 10/2016 | Kandukuri ............. G06F 11/00 |
| 2016/0350440 | A1 | 12/2016 | Vaishnav et al. |
| 2017/0078715 | A1 | 3/2017 | Chao |
| 2018/0089183 | A1 | 3/2018 | Schwartz et al. |
| 2020/0068038 | A1 * | 2/2020 | Xing ........................ H04L 69/40 |
| 2020/0311054 | A1 | 10/2020 | Hicks et al. |
| 2020/0365258 | A1 | 11/2020 | Langer et al. |
| 2021/0165760 | A1 | 6/2021 | De Schrijver et al. |
| 2021/0191904 | A1 | 6/2021 | Lee et al. |
| 2021/0326319 | A1 | 10/2021 | Jernigan, IV et al. |
| 2022/0245092 | A1 | 8/2022 | Jujjuri et al. |
| 2022/0317882 | A1 | 10/2022 | Vijayan et al. |
| 2022/0391372 | A1 | 12/2022 | Oliva et al. |
| 2023/0004543 | A1 | 1/2023 | Jernigan, IV et al. |
| 2023/0135583 | A1 | 5/2023 | Jernigan, IV |
| 2024/0411744 | A1 | 12/2024 | Jernigan, IV |

FOREIGN PATENT DOCUMENTS

| | | | |
|---|---|---|---|
| WO | WO 0235799 | A2 * | 5/2002 |
| WO | WO 2011054376 | A1 * | 5/2011 |
| WO | 2018128825 | A1 | 7/2018 |

OTHER PUBLICATIONS

P. Agarwal et al., "Performance analysis by topology indexed lookup tables", 2005 IEEE International Symposium on Circuits and Systems (ISCAS), May 2005, pp. 1-4.*

Notice of Allowance mailed on May 14, 2024 for U.S. Appl. No. 17/728,709, filed Apr. 25, 2022, 08 pages.

Anonymous., "Shard (Database Architecture)—Wikipedia," Wikipedia the Free Encyclopedia, Nov. 2, 2021, Retrieved from the Internet: URL: https://en.wikipedia.org/w/index.php?title=Shard_database_architecture&oldid=1053152485 [retrieved on Feb. 1, 2023].

Buckets overview—Amazon Simple Storage Service (S3), User guide, Retrieved from the Internet URL: https://docs.aws.amazon.com/AmazonS3/latest/userguide/UsingBucket.html [retrieved on Aug. 21, 2023], 06 pages.

International Search Report and Written Opinion for Application No. PCT/US2022/048712, mailed on Feb. 10, 2023, 15 pages.

Non-Final Office Action mailed on Dec. 6, 2023 for U.S. Appl. No. 17/728,709, filed Apr. 25, 2022, 10 pages.

Non-Final Office Action mailed on May 25, 2023 for U.S. Appl. No. 17/728,708, filed Apr. 25, 2022, 34 pages.

Notice of Allowance mailed on Aug. 31, 2023 for U.S. Appl. No. 17/728,708, filed Apr. 25, 2022, 9 pages.

Qin L., et al., "An Adaptive Load Balancing Algorithm in Object-Based Storage Systems," 2006 International Conference on Machine Learning and Cybernetics, 2006, pp. 297-302.

Won Y., et al., "Efficient Index Lookup for De-duplication Backup System," 2008 IEEE International Symposium on Modeling, Analysis and Simulation of Computers and Telecommunication Systems, 2008, pp. 1-3.

Non-Final Office Action mailed on Apr. 10, 2025 for U.S. Appl. No. 18/809,930, filed Aug. 20, 2024, 17 pages.

\* cited by examiner

1500

1510

1550

1570

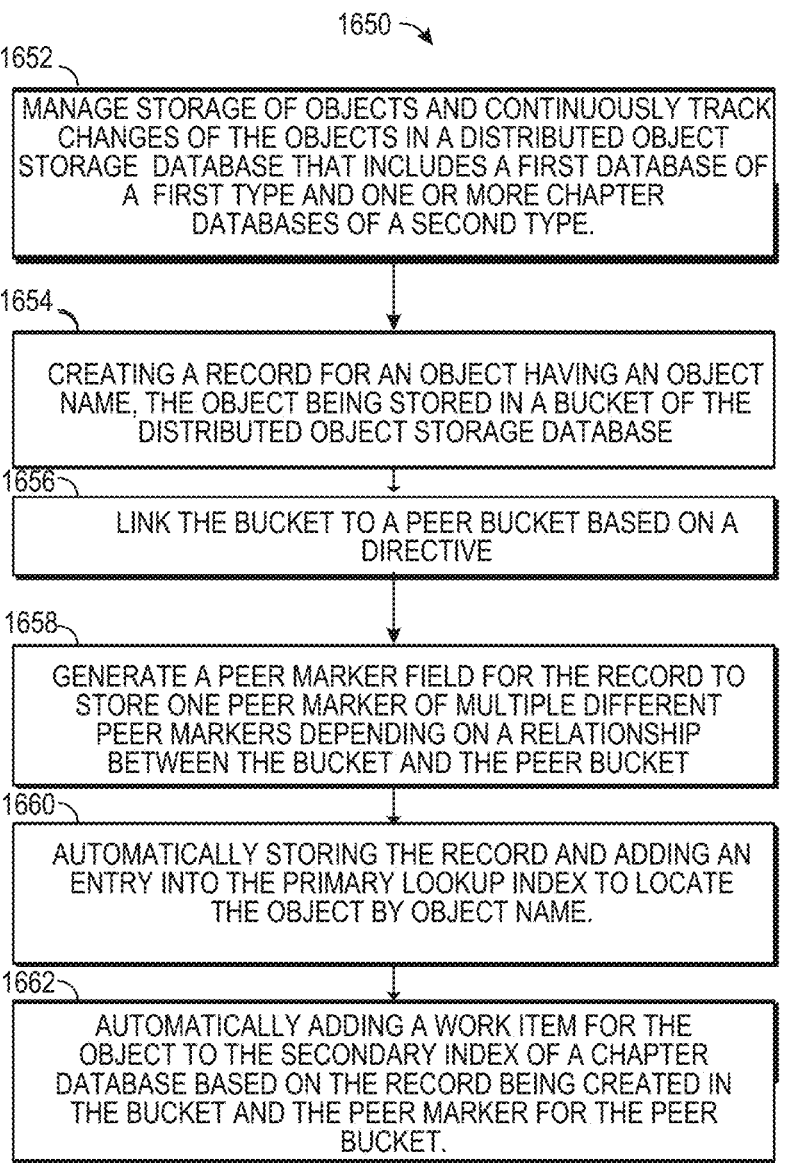

1650

1652

MANAGE STORAGE OF OBJECTS AND CONTINUOUSLY TRACK CHANGES OF THE OBJECTS IN A DISTRIBUTED OBJECT STORAGE DATABASE THAT INCLUDES A FIRST DATABASE OF A FIRST TYPE AND ONE OR MORE CHAPTER DATABASES OF A SECOND TYPE.

1654

CREATING A RECORD FOR AN OBJECT HAVING AN OBJECT NAME, THE OBJECT BEING STORED IN A BUCKET OF THE DISTRIBUTED OBJECT STORAGE DATABASE

1656

LINK THE BUCKET TO A PEER BUCKET BASED ON A DIRECTIVE

1658

GENERATE A PEER MARKER FIELD FOR THE RECORD TO STORE ONE PEER MARKER OF MULTIPLE DIFFERENT PEER MARKERS DEPENDING ON A RELATIONSHIP BETWEEN THE BUCKET AND THE PEER BUCKET

1660

AUTOMATICALLY STORING THE RECORD AND ADDING AN ENTRY INTO THE PRIMARY LOOKUP INDEX TO LOCATE THE OBJECT BY OBJECT NAME.

1662

AUTOMATICALLY ADDING A WORK ITEM FOR THE OBJECT TO THE SECONDARY INDEX OF A CHAPTER DATABASE BASED ON THE RECORD BEING CREATED IN THE BUCKET AND THE PEER MARKER FOR THE PEER BUCKET.

FIG. 16B

TABLE

1710

| VSERVER | PROVIDER UUID | NAME | PROTOCOL | ADDRESSES | OTHER PROPERTIES |
|---------|---------------|------|----------|-----------|------------------|
| VS0 | {9F32-1157-2A-…} | "AWS-EAST" | S3 | 185.22.75.38:615 | SSL, CREDENTIALS, ETC… |
| VS0 | {0517-BFBE-13-…} | "SG" | S3 | 10.98.0.35:615 | SSL, CREDENTIALS, ETC… |

FIG. 17A

LINK TABLE

1720

| VSERVER | ACTIVE MIRROR | LINK ID | TOPOLOGY | LINK TYPE | PEER | OTHER PROPERTIES |
|---------|---------------|---------|----------|-----------|------|------------------|
| VS0 | "MY_BUCKET" | 1075 | {3288-4112-…} | PASSIVE MIRROR | "SG" : "S_BUCKET" | RPO, ETC… |
| VS0 | "MY_BUCKET" | 1076 | {3288-4112-…} | CAPACITY TIER | "SG" : "S_BUCKET" | RPO, ETC… |

FIG. 17B

Figures 18A, 18B:
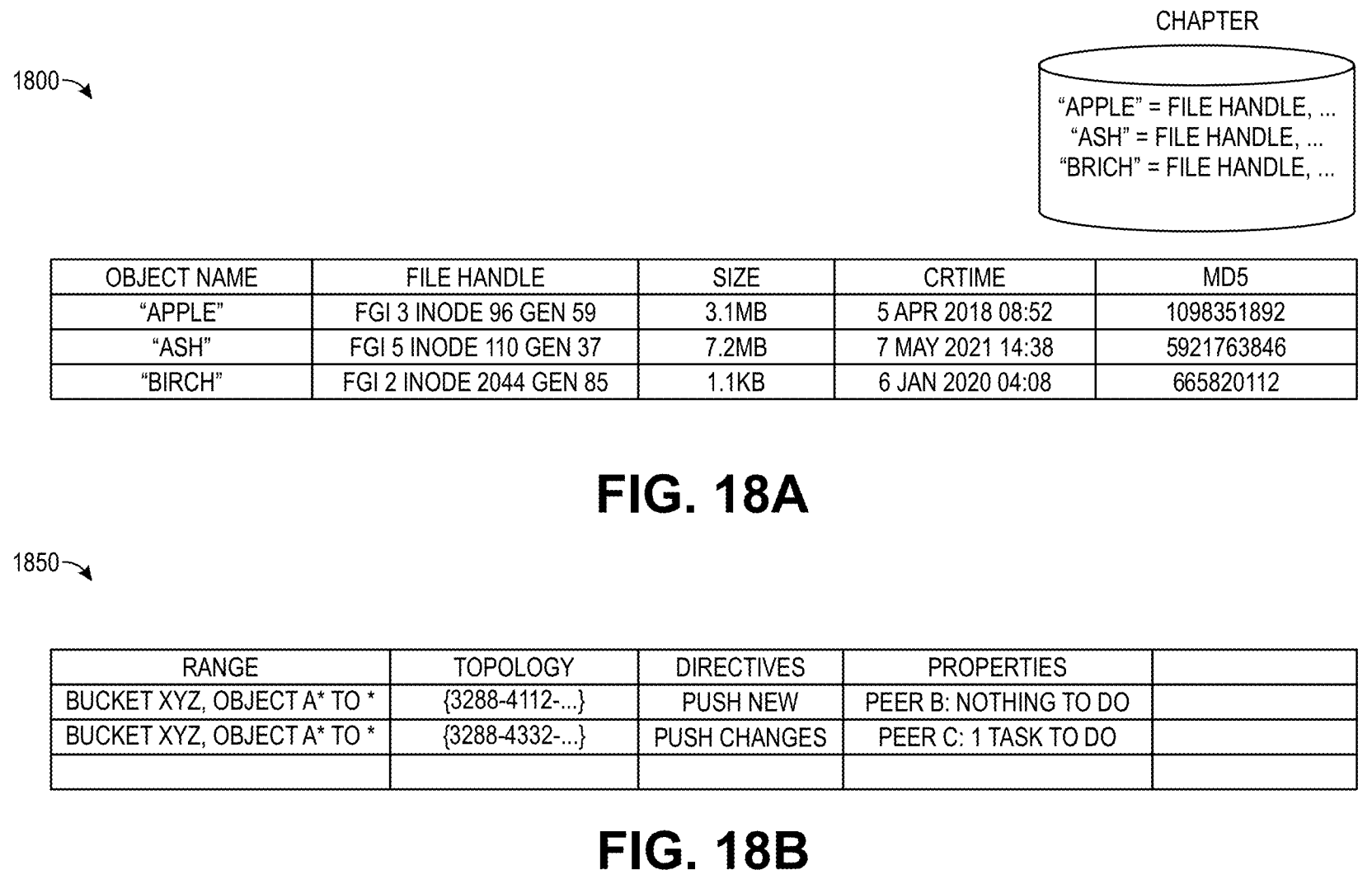

CHAPTER

"APPLE" = FILE HANDLE, ...
"ASH" = FILE HANDLE, ...
"BRICH" = FILE HANDLE, ...

1800 →

| OBJECT NAME | FILE HANDLE | SIZE | CRTIME | MD5 |
|---|---|---|---|---|
| "APPLE" | FGI 3 INODE 96 GEN 59 | 3.1MB | 5 APR 2018 08:52 | 1098351892 |
| "ASH" | FGI 5 INODE 110 GEN 37 | 7.2MB | 7 MAY 2021 14:38 | 5921763846 |
| "BIRCH" | FGI 2 INODE 2044 GEN 85 | 1.1KB | 6 JAN 2020 04:08 | 665820112 |

| RANGE | TOPOLOGY | DIRECTIVES | PROPERTIES |
|---|---|---|---|
| BUCKET XYZ, OBJECT A* TO * | {3288-4112-...} | PUSH NEW | PEER B: NOTHING TO DO |
| BUCKET XYZ, OBJECT A* TO * | {3288-4332-...} | PUSH CHANGES | PEER C: 1 TASK TO DO |
| | | | |

| LOCAL FILE HANDLE | PEER MARKER 1910 | INDEX? 1912 | WHAT ACTION? |
|---|---|---|---|
| VALID FH: AN OBJECT WITH THIS NAME EXISTS, AND THERE IS A COPY OF ITS DATA RIGHT HERE IN THIS BUCKET | NONE | YES* | THE LINKED PEER DOES NOT HAVE THIS OBJECT YET, BUT LB DOES! CTM TO PUSH THE OBJECT TO THE PEER. *THIS ONLY APPLIES FOR MIRROR PEERS; FOR EVERYONE ELSE, CTM DOES NOTHING AND INDEX?=FALSE |
| | PARTIAL | YES | THIS PEER POTENTIALLY HAS A STALE COPY OF THE OBJECT. CTM HAS A RESPONSIBILITY TO PUSH THE OBJECT TO THE PEER |
| | COMPLETE | NO | LB HAS THE OBJECT, BUT SO DOES THIS PEER. NOTHING MORE TO DO |

| LOCAL FILE HANDLE | PEER MARKER 2010 | INDEX? 2012 | WHAT ACTION? |
|---|---|---|---|
| SPARSE: AN OBJECT WITH THIS NAME EXISTS IN THE BUCKET, BUT LB DOESN'T HAVE THE DATA HERE | NONE | YES* | LINKED PEER DOES NOT HAVE THIS OBJECT YET, BUT LB DOES! CTM TO PUSH THE OBJECT TO THE PEER. *THIS ONLY APPLIES FOR MIRROR PEERS; FOR EVERYONE ELSE, DO NOTHING AND INDEX?=FALSE |
| | PARTIAL | YES | THIS PEER POTENTIALLY HAS A STALE COPY OF THE OBJECT. CTM HAS A RESPONSIBILITY TO PUSH THE OBJECT TO THE PEER. AS WITH THE STATE ABOVE, CTM MAY NEED TO GET THE DATA OURSELVES FIRST |
| ONE OF OUR LINKED PEERS WILL HAVE A COMPLETE RECORD, SHOWING WHERE THE DATA CAN BE FOUND | COMPLETE | NO | THIS PEER SAYS IT HAS THE OBJECT, SO LB IS CONTENT. IF LB NEEDS THE DATA LATER, LB CAN ASK THIS PEER FOR IT |

Figures 21, 22A:
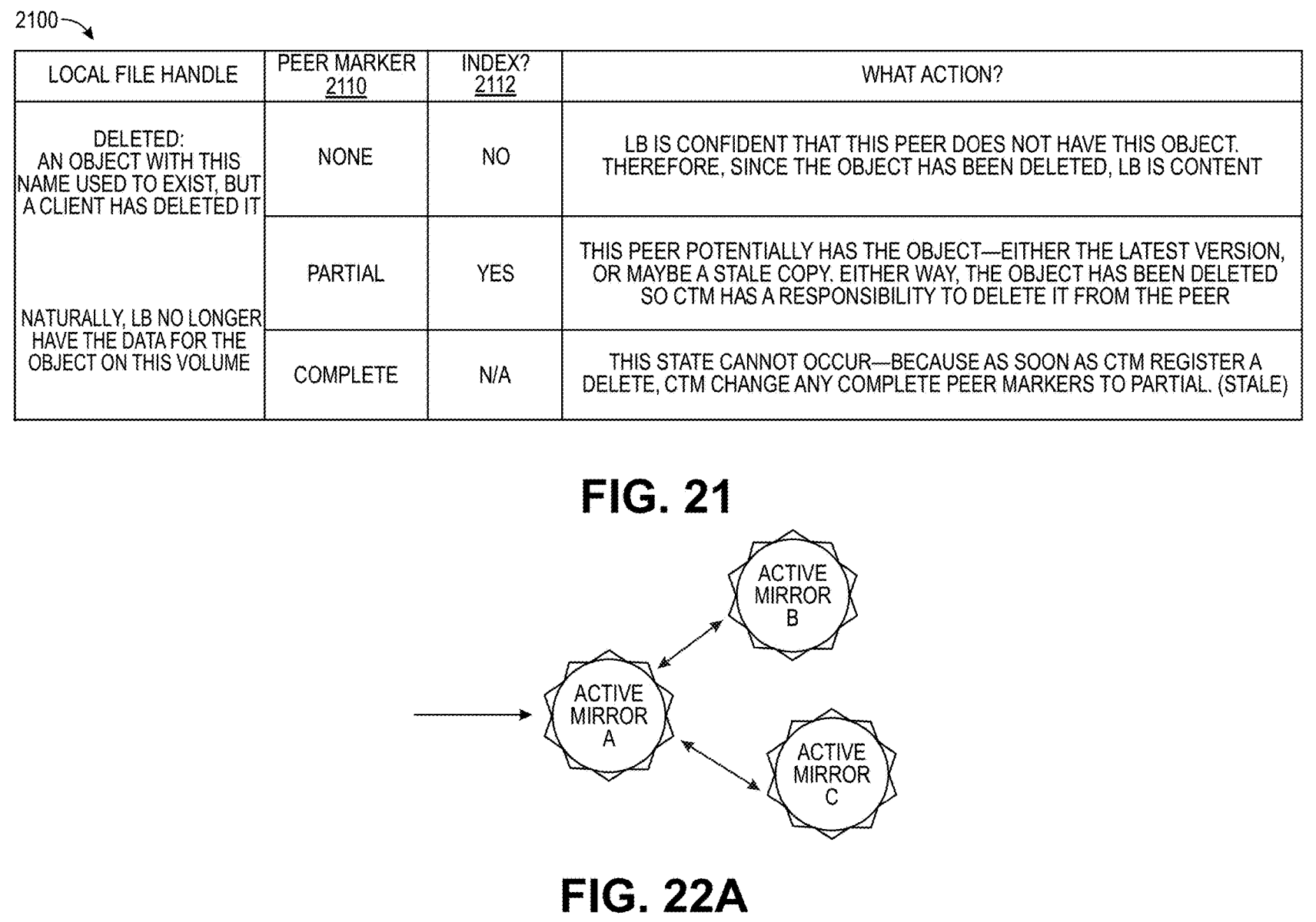

| LOCAL FILE HANDLE | PEER MARKER 2110 | INDEX? 2112 | WHAT ACTION? |
|---|---|---|---|
| DELETED: AN OBJECT WITH THIS NAME USED TO EXIST, BUT A CLIENT HAS DELETED IT | NONE | NO | LB IS CONFIDENT THAT THIS PEER DOES NOT HAVE THIS OBJECT. THEREFORE, SINCE THE OBJECT HAS BEEN DELETED, LB IS CONTENT |
|  | PARTIAL | YES | THIS PEER POTENTIALLY HAS THE OBJECT—EITHER THE LATEST VERSION, OR MAYBE A STALE COPY. EITHER WAY, THE OBJECT HAS BEEN DELETED SO CTM HAS A RESPONSIBILITY TO DELETE IT FROM THE PEER |
| NATURALLY, LB NO LONGER HAVE THE DATA FOR THE OBJECT ON THIS VOLUME | COMPLETE | N/A | THIS STATE CANNOT OCCUR—BECAUSE AS SOON AS CTM REGISTER A DELETE, CTM CHANGE ANY COMPLETE PEER MARKERS TO PARTIAL. (STALE) |

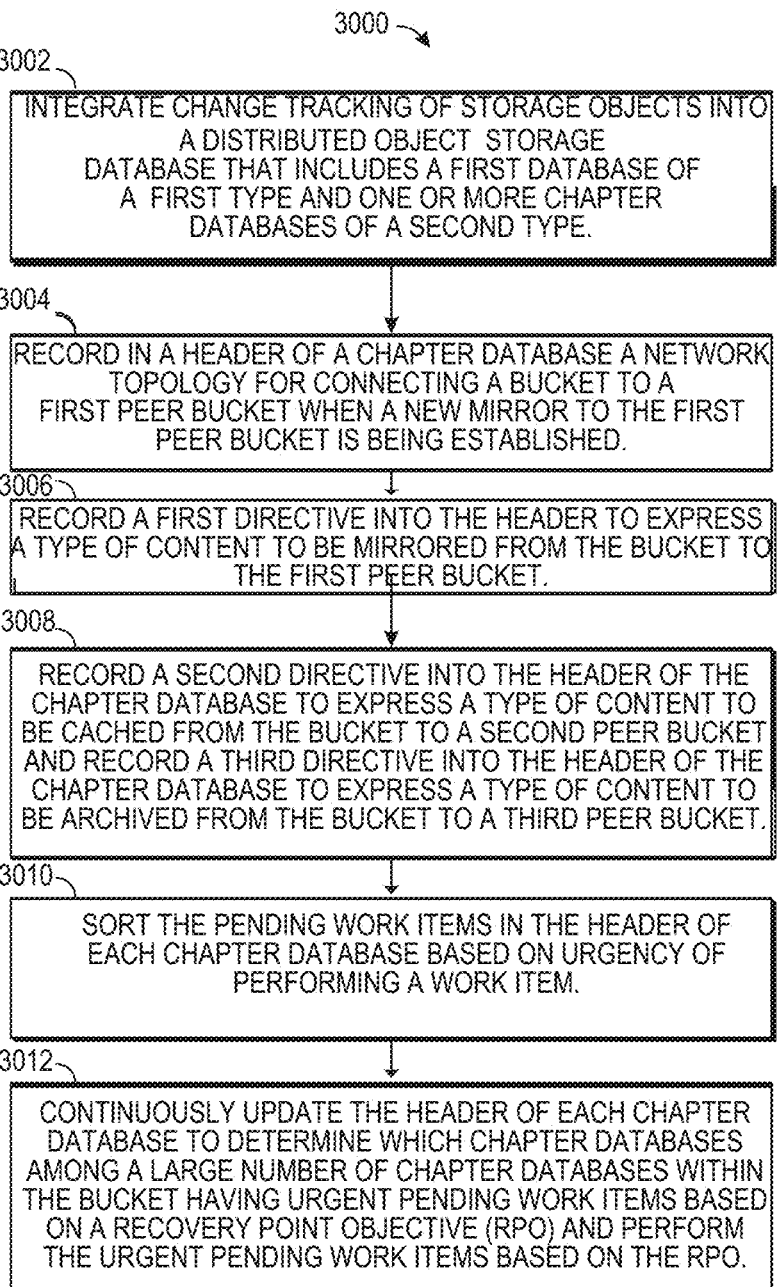

3000

3002
INTEGRATE CHANGE TRACKING OF STORAGE OBJECTS INTO A DISTRIBUTED OBJECT STORAGE DATABASE THAT INCLUDES A FIRST DATABASE OF A FIRST TYPE AND ONE OR MORE CHAPTER DATABASES OF A SECOND TYPE.

3004
RECORD IN A HEADER OF A CHAPTER DATABASE A NETWORK TOPOLOGY FOR CONNECTING A BUCKET TO A FIRST PEER BUCKET WHEN A NEW MIRROR TO THE FIRST PEER BUCKET IS BEING ESTABLISHED.

3006
RECORD A FIRST DIRECTIVE INTO THE HEADER TO EXPRESS A TYPE OF CONTENT TO BE MIRRORED FROM THE BUCKET TO THE FIRST PEER BUCKET.

3008
RECORD A SECOND DIRECTIVE INTO THE HEADER OF THE CHAPTER DATABASE TO EXPRESS A TYPE OF CONTENT TO BE CACHED FROM THE BUCKET TO A SECOND PEER BUCKET AND RECORD A THIRD DIRECTIVE INTO THE HEADER OF THE CHAPTER DATABASE TO EXPRESS A TYPE OF CONTENT TO BE ARCHIVED FROM THE BUCKET TO A THIRD PEER BUCKET.

3010
SORT THE PENDING WORK ITEMS IN THE HEADER OF EACH CHAPTER DATABASE BASED ON URGENCY OF PERFORMING A WORK ITEM.

3012
CONTINUOUSLY UPDATE THE HEADER OF EACH CHAPTER DATABASE TO DETERMINE WHICH CHAPTER DATABASES AMONG A LARGE NUMBER OF CHAPTER DATABASES WITHIN THE BUCKET HAVING URGENT PENDING WORK ITEMS BASED ON A RECOVERY POINT OBJECTIVE (RPO) AND PERFORM THE URGENT PENDING WORK ITEMS BASED ON THE RPO.

FIG. 30

INTEGRATING CHANGE TRACKING OF STORAGE OBJECTS OF A DISTRIBUTED OBJECT STORAGE DATABASE INTO A DISTRIBUTED STORAGE SYSTEM

CROSS-REFERENCE TO RELATED APPLICATIONS

This application is a continuation of U.S. patent application Ser. No. 17/728,708, filed on Apr. 25, 2022, which claims the benefit of U.S. Provisional Application No. 63/275,135, filed on Nov. 3, 2021, both of which are hereby incorporated by reference in their entirety for all purposes.

COPYRIGHT NOTICE

FIELD

Various embodiments of the present disclosure generally relate to multi-site distributed data storage systems. In particular, some embodiments relate to integrating change tracking of storage objects of a distributed object storage database into a distributed storage system.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Clients may store content in a distributed storage system. For example, a client may store thousands, millions, or billions of storage objects (also referred to as "objects") in the distributed storage system. Objects may be identified by their names, and the distributed storage system may also store object names of the objects. As the number of objects stored in the distributed storage system continues to grow, it may be difficult to store the objects and their names in an efficient manner. If a single database stores a collection of the object names, all namespace requests may be transmitted to the single database, potentially creating an access bottleneck for these requests.

SUMMARY

Distributed data storage systems and methods are described for integrating a change tracking mechanism with scalable databases to provide data protection of storage objects at a granularity of a bucket. This change tracking mechanism provides a change tracking system for each bucket with each active bucket tracking its relationships with peer buckets, determining when to push objects to peered buckets, and determining data to be pulled from peer buckets in order to provide an independent storage policy at a granularity of a bucket. The change tracking mechanism can provide numerous capabilities including mirroring, archival, caching, tiering, replication, migration, and other such capabilities that can be implemented on a per bucket basis. According to one embodiment, a computer implemented method performed by one or more processing resources of a distributed storage system comprises managing storage of objects and continuously tracking changes of the objects in a distributed object storage database that includes a first database of a first type and one or more chapter databases of a second type with the distributing object storage database supporting a primary lookup index and a secondary lookup index in order to locate a record, creating a record for an object having an object name, the object being stored in a bucket of the distributed object storage database of the distributed storage system, linking the bucket to a peer bucket based on a directive, generating a peer marker field for the record to store one peer marker of multiple different peer markers depending on a relationship between the bucket and the peer bucket; and automatically adding a work item for the object to the secondary index of a chapter database based on the record being created in the bucket and the peer marker for the peer bucket.

Some embodiments relate to a computer implemented method performed by one or more processing resources of a distributed object storage database, the method comprises integrating change tracking of storage objects into the distributed object storage database that includes a first database of a first type and one or more chapter databases of a second type with the distributed object storage database supporting a primary lookup index and a secondary lookup index in order to locate a storage object, recording in a header of a chapter database a network topology for connecting a bucket having the chapter database to a first peer bucket when a new mirror to the first peer bucket is being established, and recording a first directive into the header of the chapter database to express a type of content to be mirrored from the bucket to the first peer bucket.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 16A illustrates a flow of a per chapter process and FIG. 16B illustrates a flow for creating an object and adding an entry into a secondary index in accordance with one embodiment.

FIG. 16B illustrates a computer implemented method performed by one or more processing resources of a distributed storage system to create an object in a distributed object storage database and adding an entry to a secondary index of a chapter database in accordance with one embodiment.

FIGS. 17A and 17B illustrate a storage provider table and a link table respectively in accordance with one embodiment.

FIG. 18A illustrates an example of a chapter record layout 1800 and FIG. 18B illustrates a header of a chapter database in accordance with one embodiment.

FIG. 19 illustrates an example of a peer marker and index table 1900 in accordance with one embodiment.

FIG. 20 illustrates an example of a peer marker and index table 2000 in accordance with one embodiment.

FIG. 21 illustrates an example of a peer marker and index table 2100 in accordance with one embodiment.

FIG. 22A illustrates a network topology with multiple active mirrors in accordance with one embodiment.

FIG. 30 illustrates a computer implemented method performed by one or more processing resources of a distributed storage system to integrate change tracking of storage objects into a distributed object storage database of the distributed storage system in accordance with one embodiment.

DETAILED DESCRIPTION

Figure 1:
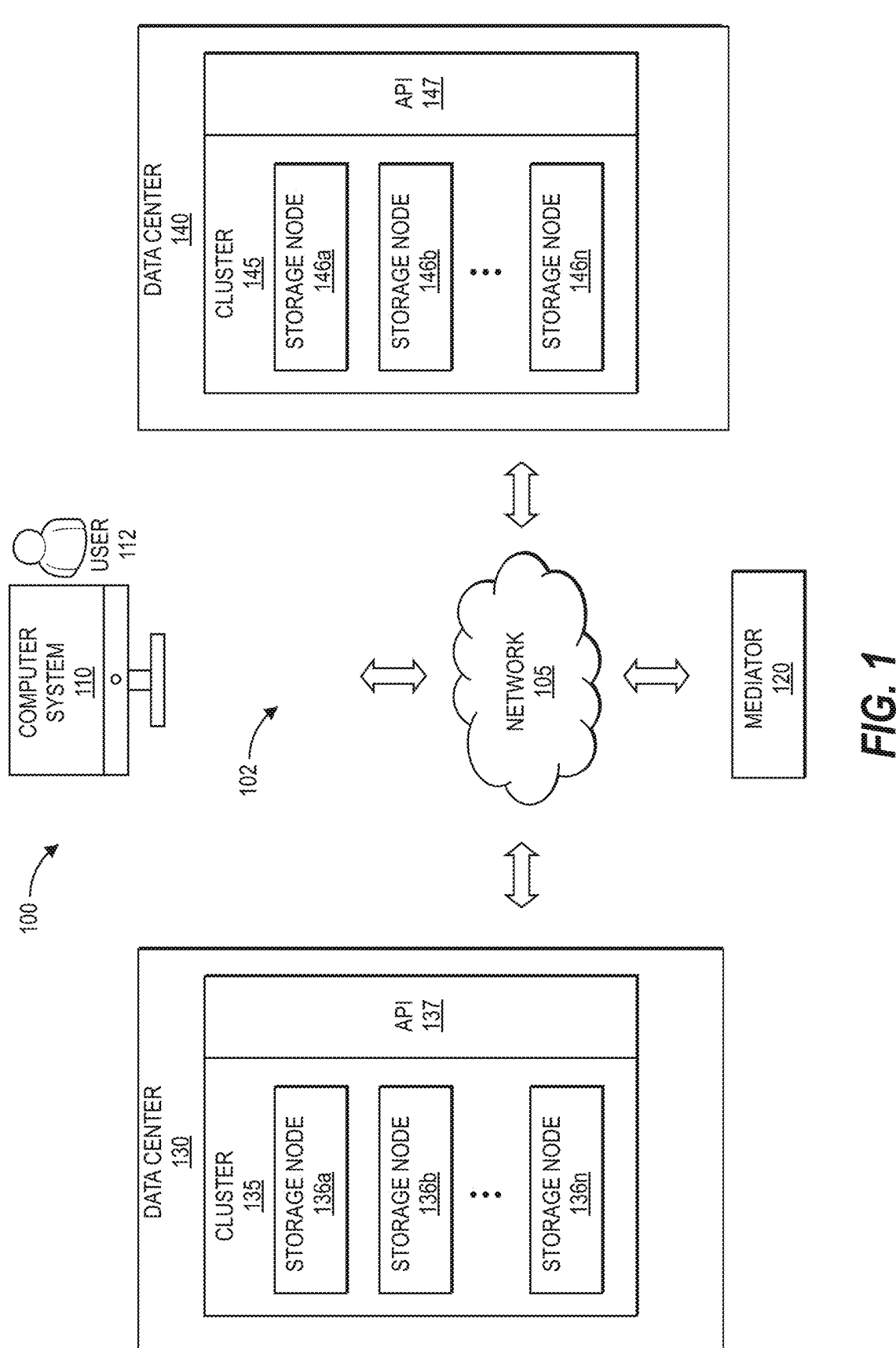
FIG. 1 is a block diagram illustrating an environment in which various embodiments may be implemented.

In one example, an operating system of the distributed storage system contains a change tracking mechanism (or also referred to as a "change tracking manager") that is integrated with the distributed storage system. The distributed storage system interfaces with multiple storage protocols including an object storage protocol (e.g., AMAZON S3® protocol support), Network attached storage (NAS) protocols (e.g., Network File System (NFS) protocol, Common Internet File System (CIFS) protocol, and the like), and a storage area network (SAN) protocol (e.g., Small Computer System Interface (SCSI), iSCSI, hyperSCSI, Fiber Channel Protocol (FCP)). Clients can use the object storage protocol (OSP) to create objects within a bucket, which may refer to a discrete container that stores a collection of objects, of the distributed storage system. Each such object is given a name, and the collective bucket is expected to be able to later retrieve an object by that name efficiently. Further, clients expect to be able to iterate the list of named objects at any time—starting at any name—and receive subsequent names in alphabetic sort order. Of particular note, these buckets are highly scalable, supporting hundreds of billions (or more) of objects. Therefore, a bucket of the present design essentially implements a database that stores all object names, in sorted order and optimized for fast lookup.

However, this database is unusual in that it is decentralized. The database is composed of a series of smaller "chapter" databases, each responsible for tracking all the named objects having names that fit within its own assigned portion of an overall collective namespace. As names are added to one of these chapter databases, the operating system (OS) of the distributed storage system might decide that the chapter has grown "too large" in which case the OS splits the chapter into two child databases, one responsible for half of the original chapter's namespace and the other child responsible for the other half. Likewise, as names are removed, the OS might decide that a chapter has become "too small" which causes the OS to combine this chapter and one of its adjacent siblings into a new entity that encompasses the namespace responsibilities of both.

A prior approach for distributed object storage databases includes a transaction database having a transaction log to continuously track transactions and provide an ordered timestamp history for each new object or change to an object. The transaction database is separate from an object storage database that stores objects. The transaction database grows to be gigantic due to possibly having millions or billions of transactions and recording object name references for each object and history of all transactions. This prior approach has a static assignment between each computer and work load and this can lead to one computer having a large number of transactions (e.g., millions of requests per second to search for a particular word or phrase) while other computers are underutilized. If an object is created on a first computer, then the first computer handles all responsibilities such as mirroring to peers for the object. Synchronous issues arise due to having different clocks for different computers of the distributed object storage database and transaction database. This prior approach suffers from consistency issues when multiple transactions arrive simultaneously at different computers. The computers need to communicate with each other and negotiate responsibilities for handling the transactions and this slows operations of the distributed object storage database.

Embodiments described herein seek to improve various technological processes associated with cross-site storage solutions and ensure the process of efficiently replicating, caching, migrating, and archiving buckets in the distributed storage system. Various embodiments of the present technology provide for a wide range of technical effects, advantages, and/or improvements to stretched storage systems and participating distributed storage systems. For example, various embodiments may include one or more of the following technical effects, advantages, and/or improvements. This change tracking mechanism provides a change tracking system for each bucket that is integrated with a namespace object database and can reliably maintain a remote mirror of content from a first bucket to a second bucket. Each active bucket tracks its relationships with peer buckets, determines when to push objects to peered buckets, and determines data to be pulled from peer buckets in order to provide an independent storage policy on a granularity of a bucket. In one example, the change tracking system efficiently remembers "a client has created object 'foo', and that object has not yet been replicated to the mirror" and so forth. Due to its distributed nature, a bucket can contain hundreds of billions of objects, and thus all available computing resources (instead of a single static assignment to a single computer) are allowed to tackle the problem of change tracking and the process of subsequent replication as independently as possible, minimizing locking and serialization such that all available network links, storage disks, and CPUs can be utilized effectively. Equally important is the change tracking mechanism's flexibility. Using this model one can express a robust set of behaviors with respect to a peered bucket—everything from regular full-copy replication to caching, archival, migration, and even administrative tasks like purging a data set or initializing a new copy from scratch. Also, the change tracking mechanism is particularly effective at transparency. At any moment, a user can interrogate the change tracking system and effortlessly discern exactly what changes are due to be performed, at what times to sort by most urgent changes, against which peers, and representing what amount of bandwidth consumption.

This change tracking mechanism has the following features.

Implemented within the context of bucket, which—as described above—is a distributed data store spread across many storage nodes all operating in parallel and with minimal communication between these nodes.

Minimal performance cost to the primary workload: that is, logging operations—both in the form of "a client just did something which must eventually be replicated" and "I just replicated an object to the secondary mirror and so now I can remove my entry from the log saying I still need to do this work"—must be lightweight to avoid interfering with client activity.

Utilize all nodes involved in storing the bucket. That is, like the bucket namespace database itself, the mechanism for change tracking is distributed so that all resources can contribute to the process in parallel. It is not acceptable to have a single node or volume tasked with doing all change logging work, since that would quickly become a performance bottleneck.

The change tracking mechanism is scalable, supporting as many change log entries as necessary to fully populate a remote mirror—even if the origin has accumulated many billions of changes that need to be propagated to a mirror (e.g., while the mirror was inaccessible, or when a new mirror is being constructed from an already-populated primary bucket).

The change tracking mechanism is flexible, in that producing a single mirror is only a subset of the required tasks. Other related features or functions include archival, caching, tiering, replication, migration, and other such capabilities that can be implemented on a per bucket basis. Even "simple" mirroring features need to support fan-out (e.g., this bucket having multiple mirrors) and cascading (e.g., this bucket pushing its changes to mirror bucket B, which in turn pushes its changes to mirror bucket C).

The change tracking system supports approximate in-order transmission of changes. Parallel activity is integral to all parts of this change tracking system: ingest into a distributed bucket occurs in parallel; change tracking works in parallel; and transmission of those changes to a mirror occurs in parallel-but at least approximately, changes that occurred longer ago at a primary storage cluster, should be transmitted to the secondary storage cluster before more recent changes are transmitted between clusters or cloud entities.

The transmission of changes stored in the log are performed according to an administrator-controlled RPO: an intentional time-delay, which can vary for each configured replica. For example, one mirror of an originated bucket might have a one-hour RPO, meaning that if a change is made here at the primary storage cluster, no transmitting of changes occurs to the mirrored bucket until approximately one hour has passed. This process allows elimination of transient objects if an object is created and deleted again quickly prior to the one-hour RPO, there is no need to replicate it at all—and so throughput costs are minimized by waiting a short time period before transmitting changes.

Fundamentally, then, the OS and the change tracking manager implement a highly scalable, highly parallelized distributed database with an integrated change tracking system in this context. One or more of which may include various additional optimizations described further below.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Network attached storage (NAS) protocols (e.g., Network File System (NFS) protocol, Common Internet File System (CIFS) protocol, and the like) organize content in terms of files and directories. A file is a collection of data or programs stored in a memory of a computer or on a storage device. A directory may contain both files and subdirectories, which may themselves contain files and subdirectories. Further, a root directory may contain the top level and indicate a NAS namespace. For example, a caller may reach any file by specifying the names of the series of directories (starting at the root) that lead to where the file's own name is kept, and then finally the filename itself leads to the content. Additionally, a caller may rename files and directories, essentially rearranging the namespace while leaving the content itself largely unchanged.

Object storage, on the other hand, may implement a different way of organizing its content. For example, an object storage environment typically does not contain directories or files. Instead, the object storage environment may include objects, and each object is given a name which is unique within the entire object namespace or a bucket, which may refer to a discrete container that stores a collection of objects. For example, object names do not contain any sort of implicit hierarchy. Objects function as units each behaving as self-contained repositories with metadata. Each object includes the object's content, the object's unique identifier, and the object's metadata. Each object exists in a bucket.

Each of the storage nodes in FIG. 1 includes a plurality of volumes and each volume includes a plurality of buckets.

Figure 2:
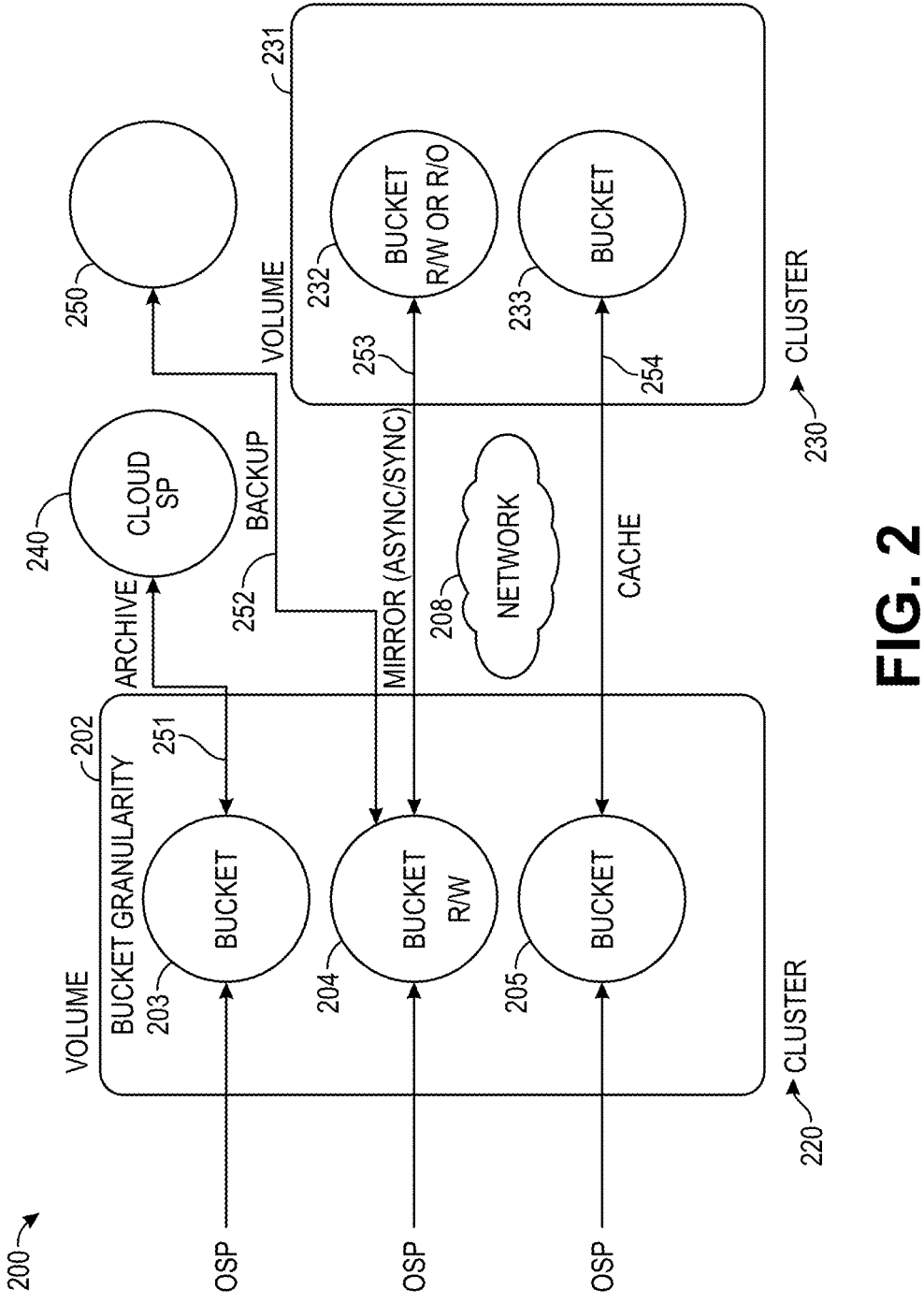
FIG. 2 is a block diagram illustrating a multi-site distributed storage system 200 in which various embodiments may be implemented.

FIG. 2 is a block diagram illustrating a multi-site distributed storage system 200 in which various embodiments may be implemented. In various examples described herein, the multi-site distributed storage system includes storage clusters 220 and 230 that are coupled to each other via a network 208, which, depending upon the particular implementation, may be a Local Area Network (LAN), a Wide Area Network (WAN), or the Internet. The bucket 240 of a cloud service provider and a bucket 250 may also be coupled to the clusters 220 and 230 via the network 208.

Those of ordinary skill in the art will appreciate additional IT infrastructure may be included within the clusters 220 and 230. In one example, the bucket 232 is a mirrored copy of the bucket 204 to provide non-disruptive operations at all times even in the presence of failures including, but not limited to, network disconnection between the clusters and buckets. The content of the bucket 204 can be mirrored via link 253 with asynchronous replication or synchronous replication to the bucket 232.

In addition to mirroring with link 253, other types of functions such as archiving with link 251, backup with link 252, and caching with link 254 can be provided by the system 200.

Turning now to the cluster 220, it includes a volume 202 that has buckets 203, 204, and 205. The cluster 230 includes a volume 231 that has buckets 232 and 233. The distributed storage system 200 has an operating system (OS) to provide data protection at a granularity of individual buckets (sub volume granularity).

Storage objects in storage systems may be subject to metadata corruption, unrecoverable aggregate, or permanent site failure. Metadata is a summary and description about data that is used to classify, organize, label, and understand data. The distributed storage systems of the present design provide data protection for storage objects with a reasonably recent copy of data depending on a recovery point objective (RPO) protection. In one example, a shorter RPO is near zero and a longer RPO may be approximately 24 hours.

Figures 3, 4:
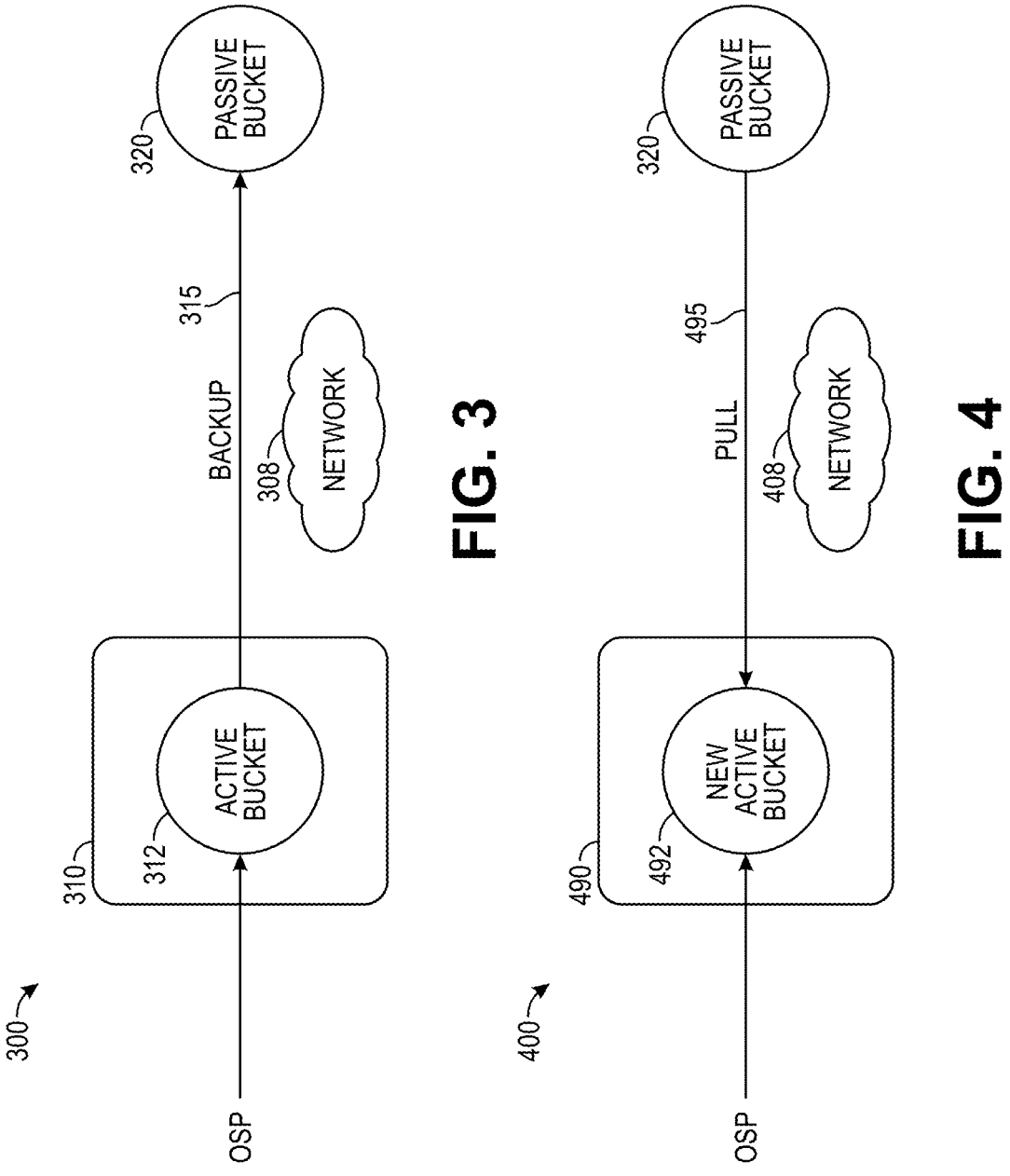
FIG. 3 is a block diagram illustrating a multi-site distributed storage system 300 with a backup capability in which various embodiments may be implemented.
FIG. 4 is a block diagram illustrating a multi-site distributed storage system 400 with a pull on demand capability in which various embodiments may be implemented.

FIG. 3 is a block diagram illustrating a multi-site distributed storage system 300 with a backup capability in which various embodiments may be implemented. Cluster 310 receives input/output operations via an object storage protocol and includes an active bucket 312 to store objects. A link 315 provides a backup capability with passive bucket 320. The link 315 pushes initial content of the active bucket 312 to a passive mirror copy of the data in the passive bucket 320 when the mirror is first created. As objects are created or deleted, the change tracking system causes the link 315 to update the created or deleted objects in the passive bucket 320. The passive bucket 320 may be located with a cloud service provider and minimal cloud transfer costs occur due to a time delay in updating the passive bucket. Thus, transient objects are never even replicated when these transient objects change during the time delay for the RPO. In various examples described herein, the storage cluster 310 and bucket 320 are coupled to each other via a network 308, which, depending upon the particular implementation, may be a Local Area Network (LAN), a Wide Area Network (WAN), or the Internet.

Figures 5, 6:
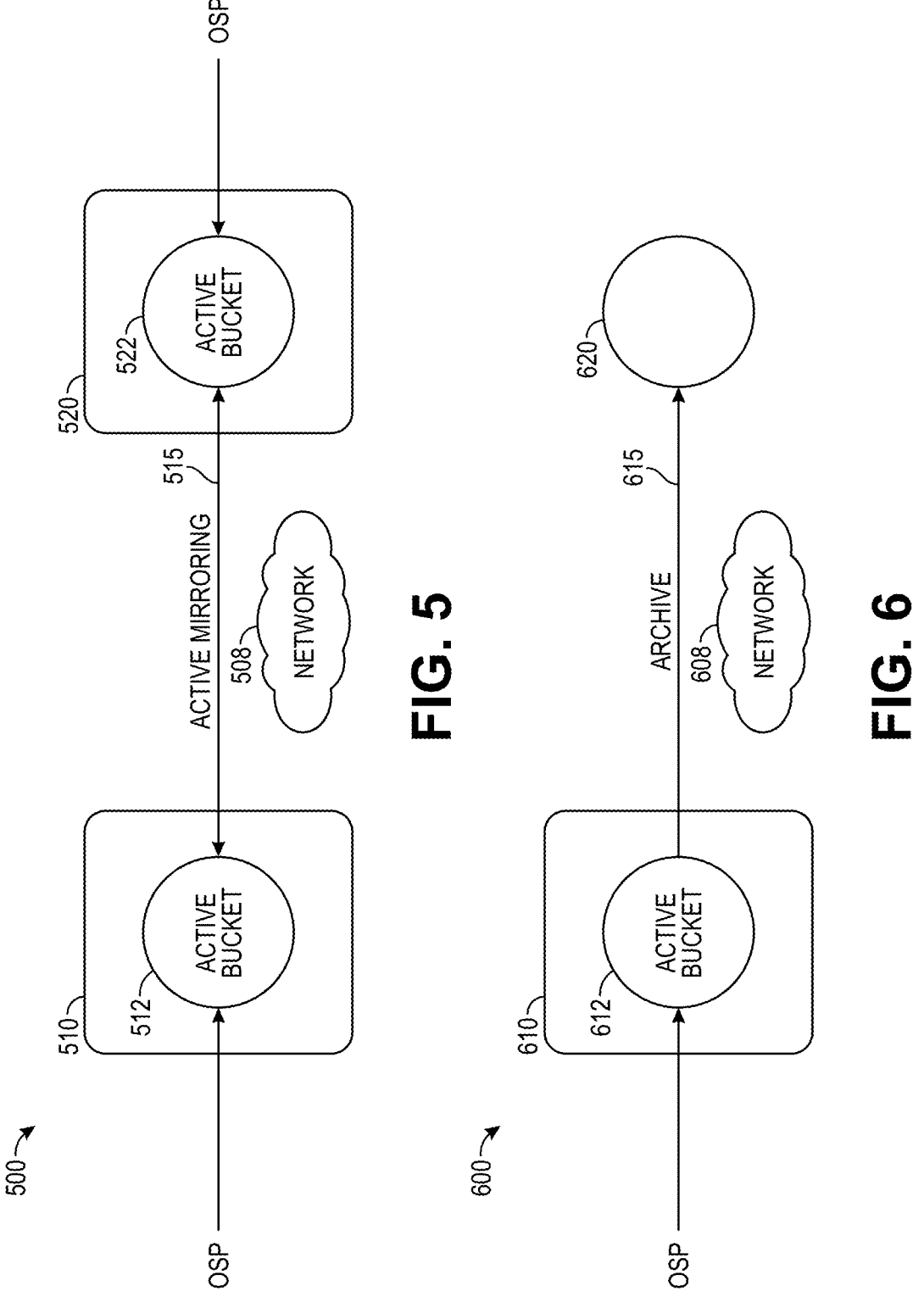
FIG. 5 is a block diagram illustrating a multi-site distributed storage system 500 with an active mirroring capability in which various embodiments may be implemented.
FIG. 6 is a block diagram illustrating a multi-site distributed storage system 600 with an archiving capability in which various embodiments may be implemented.

FIG. 4 is a block diagram illustrating a multi-site distributed storage system 400 with a pull on demand capability in which various embodiments may be implemented. In one example, the original active bucket 312 has been lost irrevocably while the passive bucket 320 is still available to provide a restore of data. Cluster 490 receives input/output operations via an object storage protocol and includes a new active bucket 492 to be reconstructed from the objects of the passive bucket 320. A pull-on-demand link 495 provides a restore capability with passive bucket 320. The link 495 pulls content of the passive bucket 320 to the new active bucket 492. Within a few seconds, full read/write operations can resume on the new active bucket 492 and clients will see all objects immediately that have been restored from the passive bucket 320. In the background, the change tracking system repopulates the active bucket from the backup copy in the passive bucket 320. In various examples described herein, the storage cluster 490 and bucket 320 are coupled to each other via a network 408, which, depending upon the particular implementation, may be a Local Area Network (LAN), a Wide Area Network (WAN), or the Internet FIG. 5 is a block diagram illustrating a multi-site distributed storage system 500 with a mirroring capability in which various embodiments may be implemented. In one example, the original active bucket 512 may have a temporary site or storage outage causing concern for availability of networking, power, or other failure at the storage cluster 510. Clusters 510 and 520 both receive input/output operations via an object storage protocol. An active mirroring link 515 provides active mirroring of objects between the active bucket 512 and an active bucket 522 to provide a short RPO. Both active buckets support read/write operations (though at any time one side can be chosen to be read only). Each active bucket has the same data set, each bucket presents the same data set, and if either one changes, then the changes are replicated to the other bucket automatically.

If one storage cluster has a temporary site or storage outage and recovers, then the change tracking system automatically replicates any changes during the temporary outage from the other cluster to the cluster that is recovering. In various examples described herein, the storage clusters 510 and 520 are coupled to each other via a network 508, which, depending upon the particular implementation, may be a Local Area Network (LAN), a Wide Area Network (WAN), or the Internet.

FIG. 6 is a block diagram illustrating a multi-site distributed storage system 600 with an archiving capability in which various embodiments may be implemented. In one example, this storage system 600 is designed to integrate an external $3^{rd}$ party storage (e.g., storage from a cloud service provider) of bucket 612 to reduce costs for users. Workloads in some buckets, but not all, might be suitable for off-site 3$^{rd}$ party storage. An active bucket 612 is linked to a lower cost capacity tier of external storage with archive link 615. An administrator can select individual buckets that can archive their cold data (e.g., rarely or infrequently used data) to the external storage. The change tracking system identifies cold objects that have not been accessed recently by read-time, replicates these cold objects to off-site storage, and thus free local storage within the cluster 610. Upon a read access, archived objects are fetched from off-site storage of bucket 620 and either served from a local memory or repopulated persistently. Multiple mirrored active buckets can share a same capacity tier bucket without duplication. In various examples described herein, the storage cluster 610 and bucket 620 are coupled to each other via a network 608, which, depending upon the particular implementation, may be a Local Area Network (LAN), a Wide Area Network (WAN), or the Internet.

Figures 7, 8:
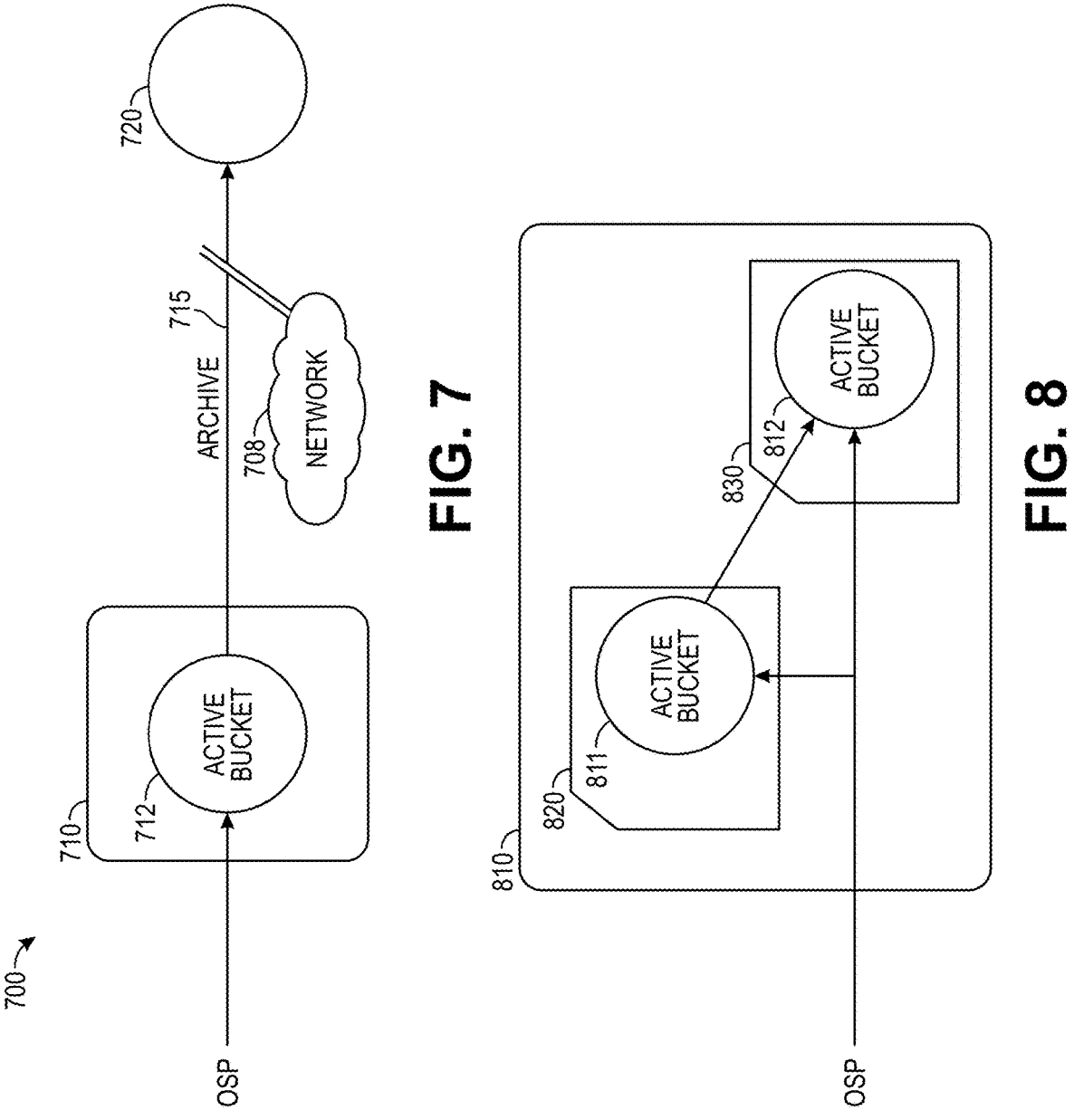
FIG. 7 is a block diagram illustrating a multi-site distributed storage system 700 with an archiving capability in which various embodiments may be implemented.
FIG. 8 is a block diagram illustrating a multi-site distributed storage system 800 with a data transfer capability in which various embodiments may be implemented.

FIG. 7 is a block diagram illustrating a multi-site distributed storage system 700 with an archiving capability in which various embodiments may be implemented. In one example, this storage system 700 is designed to allow an additional link to be added or removed between an active bucket 712 of storage cluster 710 and a passive buck 720 for an external 3$^{rd}$ party storage (e.g., storage from a cloud service provider). In various examples described herein, the storage cluster 710 and bucket 720 are coupled to each other via a network 708, which, depending upon the particular implementation, may be a Local Area Network (LAN), a Wide Area Network (WAN), or the Internet.

In one example, a previously hot project becomes lower priority and does not need expensive SSD storage. The archive link 715 allows the project to be archived in a lower cost off-site bucket 720. The link 715 can be removed to disconnect from the bucket 720 and data stays archived but no new archival occurs.

In another example, the client upgrades a lower cost external off-site bucket 720 to a performance tier and expects higher performance. The storage system is able to add one or more links between the active bucket 712 and the bucket 720 to provide the higher performance.

FIG. 8 is a block diagram illustrating a storage cluster of a multi-site distributed storage system with a data transfer capability in which various embodiments may be implemented. In one example, this storage cluster 810 is designed to move an active bucket 811 hosted by a storage medium 820 (e.g., fabric attached storage to support SSD and spinning disks) to a different storage medium 830 (e.g., only SSD for flash storage). A consistency group or grouping of volumes that is hosted by the storage medium 830 has higher performance than a consistency group or grouping of volumes that is hosted by the storage medium 820.

The data management software (or OS) of the storage cluster 810 starts migration by building a new active mirror at the destination of storage medium 830. Within seconds the destination is ready to receive full read/write operations and the active bucket 811 on the storage medium 820 becomes read only. When the data management software finishes mirroring all data into the destination at the active bucket 812, the active bucket 811 is deleted.

Figures 9, 10:
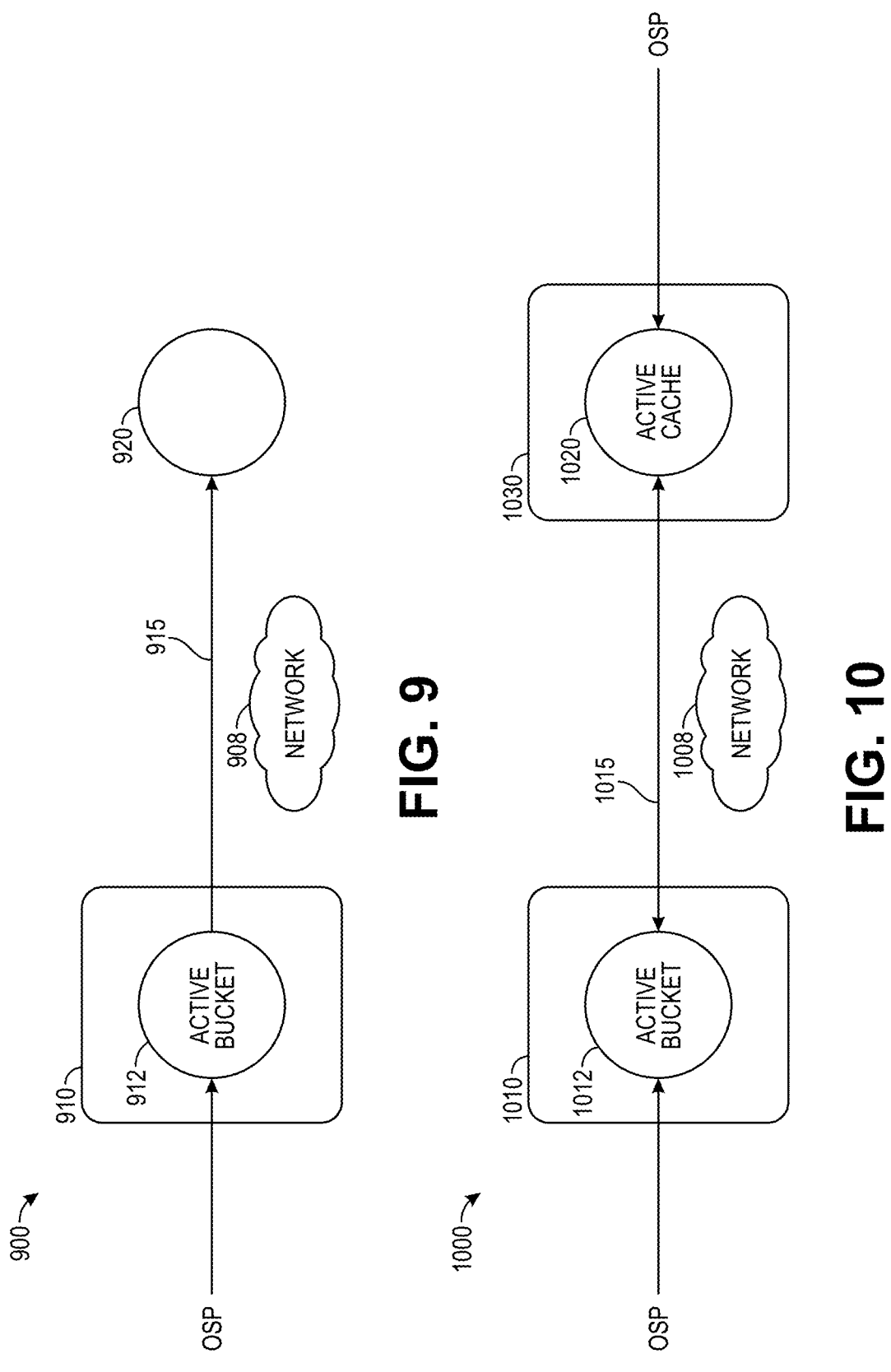
FIG. 9 is a block diagram illustrating a multi-site distributed storage system 900 in which various embodiments may be implemented.
FIG. 10 is a block diagram illustrating a multi-site distributed storage system 1000 with a caching capability in which various embodiments may be implemented.

FIG. 9 is a block diagram illustrating a storage cluster of a multi-site distributed storage system in which various embodiments may be implemented. In one example, this storage system 900 is designed to archive an entire bucket 912 outside of the cluster 910 and with an external 3$^{rd}$ party storage (e.g., storage from a cloud service provider) of bucket 920. An active bucket 912 is linked to a lower cost capacity tier of external storage with archive link 915. The client wants to retain the archived data for posterity and have the ability to restore the archived data if needed. All of the objects and metadata from the bucket 912 are pushed into the bucket 920. Zero objects remain in the local storage with this OS, but the OS still allows read only access on-demand to the bucket 920. The active bucket 912 can be deleted entirely and still be restored later from the bucket 920. In various examples described herein, the storage cluster 910 and bucket 920 are coupled to each other via a network 908, which, depending upon the particular implementation, may be a Local Area Network (LAN), a Wide Area Network (WAN), or the Internet.

FIG. 10 is a block diagram illustrating a multi-site distributed storage system 1000 with a caching capability in which various embodiments may be implemented. In one example, the storage system is designed to improve storage performance at a large primary facility having storage cluster 1010. A central service has a large OS installation and an enormous data set. A secondary facility, separated by WAN, needs fast read write access, but has a smaller footprint available. An admin creates an empty active bucket 1012 and links to active cache bucket 1020 with cache link 1015. The clusters 1010 and 1030 both receive input/output operations via an object storage protocol. The cache immediately allows read write access to the full data set. Both buckets 1012 and 1020 maintain local admin authority for snapshots, quality of service, capacity, etc. In various examples described herein, the storage clusters 1010 and 1030 are coupled to each other via a network 1008, which, depending upon the particular implementation, may be a Local Area Network (LAN), a Wide Area Network (WAN), or the Internet.

Figures 11, 12:
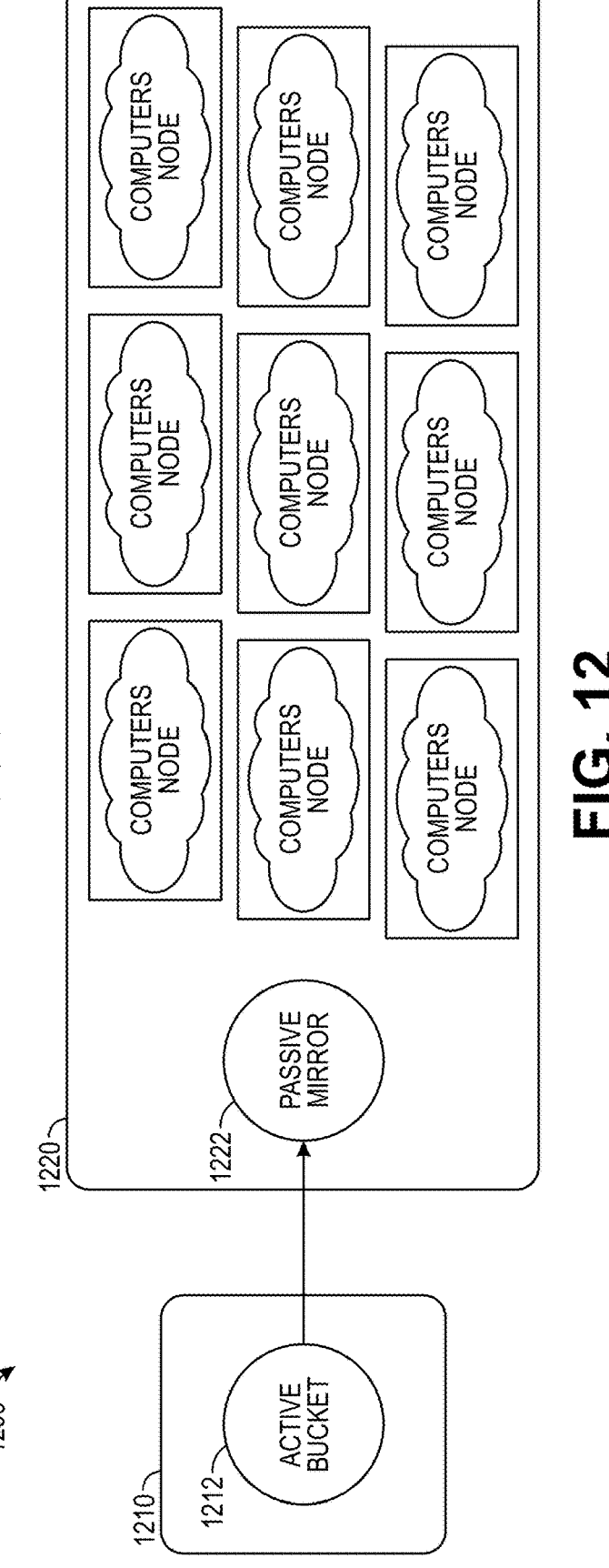
FIG. 11 is a block diagram illustrating a multi-site distributed storage system 1100 in which various embodiments may be implemented.
FIG. 12 is a block diagram illustrating a multi-site distributed storage system 1200 with a mirroring capability in which various embodiments may be implemented.

FIG. 11 is a block diagram illustrating a multi-site distributed storage system 1100 in which various embodiments may be implemented. In one example, the storage system 1100 is designed to provide a follow the sun or hub and spoke data distribution system (e.g., 24 hours/7 days per week offices around the world where some offices are active and other are sleeping, central facility house content that multiple facilities utilize). In all cases, a client has a single data set being served by multiple facilities. The storage system provides storage clusters 1110, 1120, and 1130 that function as mirrors and caches with broader topologies. Each active bucket 1112, 1122, 1132 can have up to 10 concurrent links to other buckets such as mirrors, caches, backups, etc. Mirror can cascade and fan out, passing data omni-directionally. In various examples described herein, the storage clusters of this system 1100 are coupled to each other via a network (not shown), which, depending upon the particular implementation, may be a Local Area Network (LAN), a Wide Area Network (WAN), or the Internet.

FIG. 12 is a block diagram illustrating a multi-site distributed storage system 1200 with a cloud sharing capability in which various embodiments may be implemented. In one example, the storage system 1200 is designed to provide cloud sharing by exporting a data set to a cloud server provider to reach compute nodes. A storage cluster 1210 has an active bucket 1212 with the data set to be exported to the cloud service provider 1220, which has storage and compute nodes located at same location. A passive mirror 1222 is constructed to automatically receive data from the active bucket 1212. The client's data set is stored in the active bucket 1212 and managed with the OS. The passive mirror 1222 can be maintained as long as needed and any changes in the active bucket 1212 will propagate to the passive mirror 1222. In various examples described herein, the storage clusters 1210 and provider 1220 are coupled to each other via a network (not shown), which, depending upon the particular implementation, may be a Wide Area Network (WAN), or the Internet.

Figure 13:
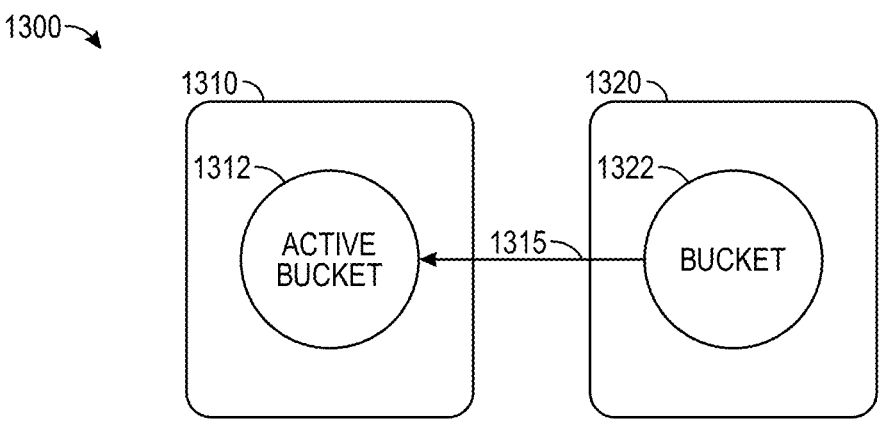
FIG. 13 is a block diagram illustrating a multi-site distributed storage system 600 with a repatriation capability in which various embodiments may be implemented.

FIG. 13 is a block diagram illustrating a multi-site distributed storage system 1300 with a repatriation capability in which various embodiments may be implemented. In one example, the client has been using an external cloud service provider having a storage cluster 1320 with original bucket 1322. The client decides to move the data to on-premises storage with storage node of storage cluster 1310. The cluster 1310 is configured with the OS to construct an active bucket 1312 by pulling data from bucket 1322 with a link 1315. The pull-on-demand link 1315 provides a repatriation capability with active bucket 1312. The link 1315 pulls content of the passive bucket 1322 to the new active bucket 1312. Within a few seconds, full read/write operations can resume on the new active bucket 1312 and clients will see all objects immediately from the passive bucket 1322. In the background, the change tracking system populates the active bucket from the passive bucket 1322. In various examples described herein, the storage clusters 1310 and 1320 are coupled to each other via a network (not shown), which, depending upon the particular implementation, may be a Wide Area Network (WAN), or the Internet.

FIGS. 2-13 illustrate different distributed storage systems and network topologies. Active Mirrors, Passive Mirrors, Active Caches, and Capacity Tiers are example roles for buckets in the network topologies. Fundamentally, all of those roles involve two basic forces: the ability to push information from A to B when appropriate, and the ability to pull information from B to A when needed. Coupled with those requirements is the need to maintain enough information to organize those activities: to know what to push (and when), and from where to pull (and why), so that the whole process is sustainable and efficient.

Figure 14:
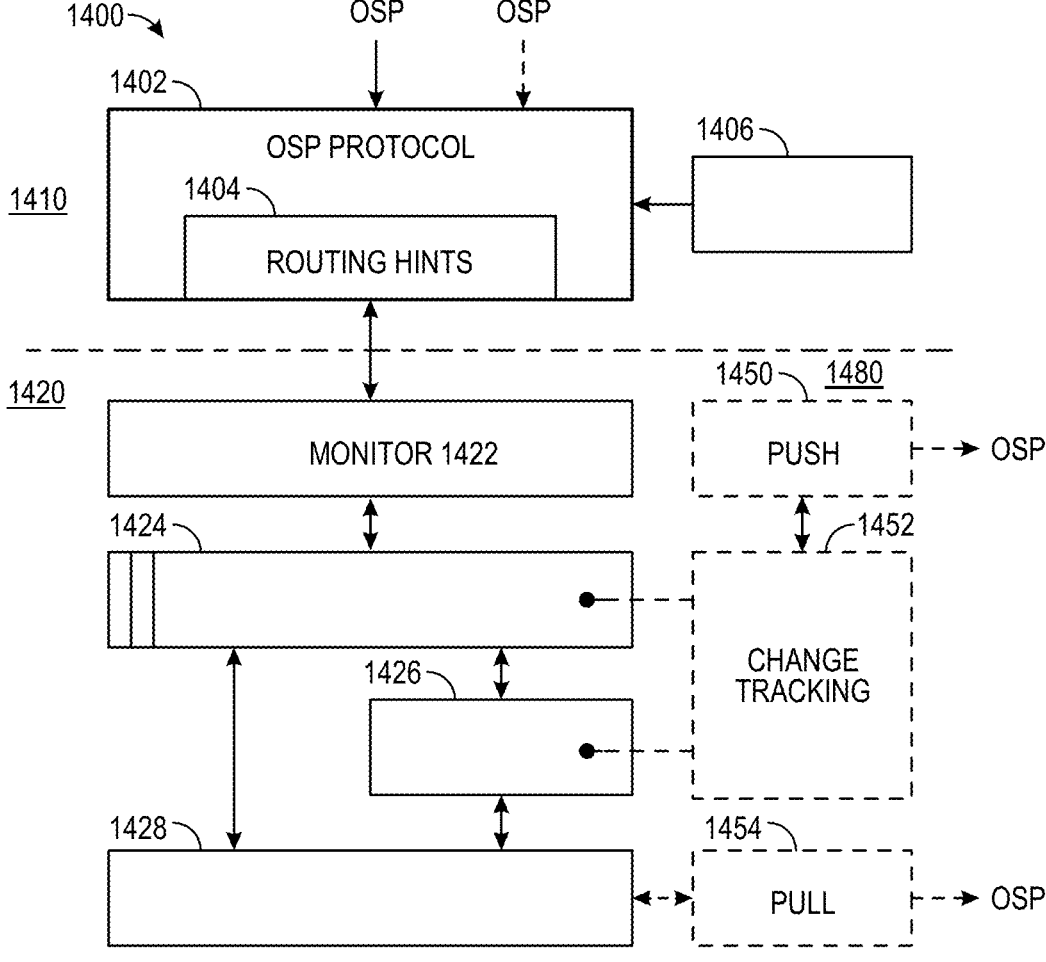
FIG. 14 illustrates a protocol stack for processing of object storage protocol operations or requests in accordance with one embodiment.

FIG. 14 illustrates a protocol stack for processing of object storage protocol operations or requests in accordance with one embodiment. Messages arrive in OSP format at OSP protocol 1402 of an upper layer 1410 of the protocol stack 1400. The messages are parsed and turned into programmatically meaningful requests encoded in a unified internal file access protocol (e.g., SpinNP). The next step is for the layer 1410 to send those requests down to the layer 1420. For objects, a bucket name (and for most requests an object name) is embedded in the request, and so the layer 1410 checks those names against its internal "routing hint" table of routing hints 1404 to determine which particular group member volume is likely a best service point for this call. If the layer 1410 guesses correctly then the upcoming call will be fast. If the layer 1410 guesses incorrectly, then the layer 1420 can at least provide a better hint and the process retries.

Down in the layer 1420, the unified internal file access protocol messages are received by a monitor 1422 (e.g., cloud storage server (CSS) monitor) which parses them briefly and passes their parameters into file system messages 1424 (e.g., WAFL messages) which the layer 1420 then posts for service locally. The file system messages that the monitor 1422 posts represent individual actions (e.g., create an object, delete an object, read an object, and so on).

As part of fulfilling those file system messages, file system message handlers have to rely on basic file system primitives 1428—allocating inodes, dirtying buffers, non-volatile logging, and so on—as well as a set of CSS-specific features that implement a collective namespace database 1426.

Although examples in this application are primarily related to objects, do keep in mind that the change tracking system is not specific to objects—it can be extended to work with other protocols.

First, note that the change tracking mechanism or change tracking manager utilizes a change tracking system (CTS) 1480, which includes push engine 1450, change tracking module 1452, and pull engine 1454. The CTS 1480 will be sending OSP-format messages. Multiple modules in the layer 1420 are expecting to send outbound OSP-format messages, and when those messages are sent to other storage nodes of the data management software or the OS, then these messages are received at a regular OSP ingest point. In one example, the layers 1410 and 1420 are part of the OS. Most messages sent by the OS of the change tracking mechanism or manager to its peers are regular OSP messages, and these messages are essentially the same whether the messages are sent to a third party entity such as a cloud service provider and whether the messages are sent to a different storage node in this same storage cluster. Moreover, when the change tracking mechanism is causing communication to a storage provider like this, if that provider happens to be running the same OS then the change tracking mechanism will implement the full protocol stack. The change tracking mechanism will ask to push and pull objects, and the routing hints and caching and clustering features of that full protocol stack are useful.

The change tracking mechanism has certain information to keep track of in order to push changes from a bucket into linked peer buckets. That change tracking is all about the persistent information that change tracking mechanism stores encoded inside the namespace database 1426—information that changes as events occur along the protocol stack (e.g., like a new object arriving or an old one being deleted). As those changes occur, the change tracking mechanism also communicates with its local "Push Engine" module so that change tracking mechanism can decide when to send outbound OSP messages to tell peers about the changes.

An object storage namespace has certain protocol requirements. In one example, the object storage namespace is a flat namespace with no directories, no hierarchy, just a long collection of unique filenames. The object storage namespace needs an efficient search, with insertion and removal by specified object name. The object storage namespace has an efficient in-order iteration of objects, optionally starting with a specified object name.

The OS that provides the change tracking mechanism scales with a flex group, up to 400 billion objects in a single bucket if needed. A flex group is conceptually a single group that can have a large number of volumes on various aggregates of various storage nodes. A large number of buckets can be located in a flex group. Redundancy needs to be supported even if we only implement redundancy for critical or common elements. The OS will utilize multiple nodes and volumes in order to avoid a single volume bottleneck. Integration needs to occur with an existing software stack architecture as illustrated in FIG. 14 and also integrate with flex group placement heuristics. In one example, objects are accessed exclusively through the OSP protocol, not NAS.

A database appropriate for an object storage namespace would be a metafile of some sort that maps bucket number and object name to the file handle that indicates a storage object location. In one example, a chapter database having variable length records is used for the object storage namespace. The database is persistent existing in an inode, non-volatile (NV) logged, and integrated with a file system. Even with billions of records, a lookup search may take only about 10 microseconds and an insert operation may take only about 50 microseconds. The database has variable length keys and records. The database may optionally have redundancy to auto-replicate to multiple flex group members such as volumes. The database supports multiple lookup indices in order to locate a record in multiple ways.

Figure 15:
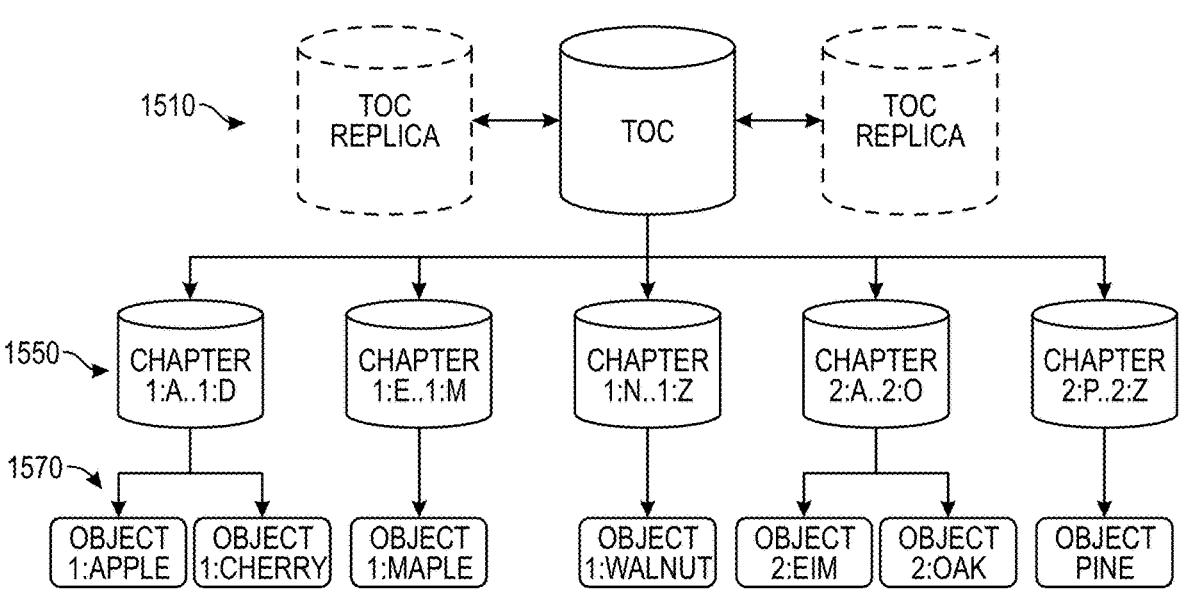
FIG. 15 illustrates a multitiered namespace built from a changing collection of small variable length databases in accordance with one embodiment.

FIG. 15 illustrates a multitiered namespace built from a constantly changing collection of small variable length databases in accordance with one embodiment. A top tier 1510 of the namespace 1500 is a single chapter database called the Table of Contents, and each record in it points to a second-tier 1550 having child databases called Chapter databases. Each chapter database is responsible for holding all names within a contiguous range of the namespace—so, one chapter might have names that start with A through F, while the next chapter has all names that start with G through H, and so on.

A Flex Group can hold lots of separate buckets. Despite each bucket having its own namespace from the customer's point of view, the parent Flex Group has a single TOC database that has to cover all buckets stored in the Flex Group. This works because the bucket number is part of the sort key for an object name, and each bucket uses its own distinct collection of chapter databases underneath for that common TOC. So not only do bucket 1's names all sort before bucket 2's names, those two buckets have entirely disjoint collections of chapter databases—meaning that any given chapter database holds object names for exactly one bucket. Each bucket starts with one chapter database when it's empty, but over time it might get more.

The collection of chapter databases used by a bucket changes over time. If the client has been doing lots of PUTs and a chapter database has grown too large, the chapter database divides itself into two databases right around its midline and updates the TOC to reflect the new responsibilities. Alternatively, if a chapter database gets too small, it merges with one of its siblings and again updates the TOC. That sort of behavior is similar to use of B+ trees—but there's only one level involved here, since the TOC itself never divides.

The TOC is stored at a fixed file id, and the TOC can be replicated among three different Flex Group members for resiliency. A special protocol helps all members know where copies of the TOC are located. The TOC itself is slow-changing: its records only change when whole chapter databases are inserted and removed. This makes the TOC a great candidate for read-only caching, both within the layer 1410 and within the layer 1420. Having that sort of high-level sorting data cacheable at the layer 1420 means that the OS can now make reasonable routing decisions to find a correct chapter for an object. If the Flex Group heuristics have been doing well, then once the correct chapter is located, it will be determined that most of the objects mentioned by that chapter are on the same member volume. This, scaling, namespace distribution, caching, automatic corruption recovery, and even built-in redundancy for the critical parts of the namespace are supported.

For the lower tier 1550, each bucket has its own discrete set of chapters. Each chapter covers a contiguous range of the namespace. Records point to individual objects 1570 with that bucket. Each object is stored as a file system index node (inode). Some object metadata is stored with the inode, some in inode labels, some in the chapter records.

Figure 16A:
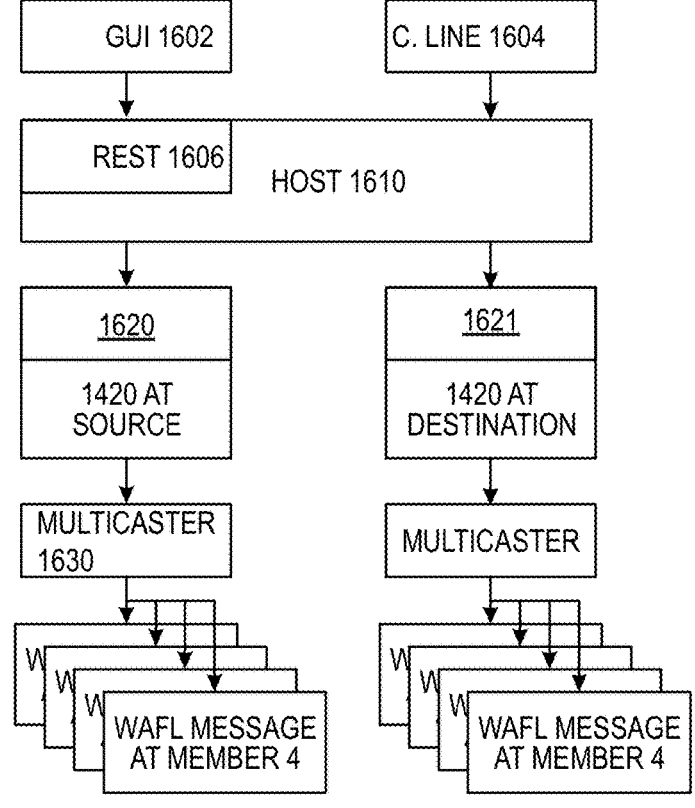

FIG. 16A illustrates a control flow of a for each chapter process in accordance with one embodiment. A command is received through GUI 1602, command-line 1604, or REST 1606. Administrative logic really starts inside the host 1610, which validates the input parameters for sanity and then establishes a "job" to remind itself to resume where it left off if the control flow is interrupted. Administrative logic performs any changes to volume location database (VLDB) that it needs to do and then it makes a call to module 1620 or 1621 for each active component involved for a link of interest that the administrator is managing. There is at least one active component because every link connects an Active Mirror with something else, and that Active Mirror counts. In the example, a regular bucket with the OS plans to create a passive mirror somewhere else. The regular bucket is going to be turned into an Active Mirror component as part of the operation, so it receives gets the call.

The module 1620 or 1621 reviews the internal Flex Group State, which can immediately tell the module the full list of member volumes for the Flex Group. Next, a Multicaster object is generated that sends a flight of messages from the multicaster 1630 to each member all in parallel. Each of those messages is received at a file system, with a goal of enumerating the TOC and looking for all chapter databases for this bucket that happen to be stored on that particular member volume. The process makes a quick communication to each of those to leave behind some state "this chapter is for a bucket that's an Active Mirror and it needs to push all its objects to remote bucket XYZ"—and then this control flow is finished. This process takes around a second or less, and the administrative task is complete.

Each file system message looks for bucket chapters on a particular member and causes an action to be performed. At steady state a TOC is read-cached everywhere and easy to enumerate.

FIGS. 17A and 17B illustrate a storage provider table and a link table respectively in accordance with one embodiment. Each entry of the storage provider table 1710 corresponds to an external storage service (not a particular bucket in that service). Entries convey protocol, address, port, credentials, SSL settings, etc.

Each entry of a link table 1720 describes one link between an Active Mirror and a uniquely identified peer. Entries are keyed by the Active Mirror and explain the peer's relationship.

Embodiments of the present invention involve integrating the change tracking system directly into an existing distributed database, by utilizing a secondary lookup index in a novel manner. As mentioned above, the collective namespace database that maps object names to storage locations is distributed such that an overall conceptual database is in practice constructed from a discrete series of smaller physical databases ("chapters" as illustrated in FIG. 15), each responsible for its own portion of the overall namespace. For example, one chapter database might be responsible for all names starting with A . . . M, and another chapter database—physically stored on a different volume and a different storage node-might be responsible for all names starting with N . . . Z. Each of these physical databases includes a primary lookup index, such that a caller who wants to find a particular object ("Holiday.JPG") must first identify the correct chapter database for performing that lookup (A . . . M) and then within the identified chapter the caller can look up the name within the primary index to discover the object's record. This record conveys the storage location of the object's actual payload (which could be anywhere in the cluster) and other salient properties of the object, like its size and creation time and so on.

Embodiments of this invention pertain to bucket replication (among other features), and this includes establishing a concept of "links" between buckets. In one example, a bucket A might have a linked peer bucket B, along with a mandate to populate its peer with any changes that it receives from clients. This bucket A might also have another linked peer bucket C that has a similar mandate, but a different RPO. With this change tracking mechanism (or change tracking manager), any time a new mirror is to be established, a desired topology connecting this bucket to its new peer is recorded into every chapter database within a header as illustrated in FIG. 18B having header 1850. This allows each chapter database to independently record its own state regarding which peers it needs to update, and why, and with what semantics (e.g., for caching, for archival, for mirroring, for migration, etc.). Thus, when the administrator issues a command to establish a new remote mirror B of an existing bucket A, the change tracking manager stamps or records data into each chapter database within bucket A that indicates, "peer B is a would-be mirror of this content, and peer B has no data yet, so all of the existing objects within this chapter need to be replicated to that bucket." This is encoded by describing peer B with a collection of one or more "directives" that express what sort of content should be sent to that peer.

Each chapter database can contain multiple directives for describing pending work items. A user header for a chapter database has a small space (e.g., 3 kb) set aside in a file block number (e.g., file block number 0) of every chapter database for an implementer to use. The chapter database stores its range in the header (e.g., "I'm for bucket XYZ, objects named A* through *"). The change tracking manager can add an optional array of up to 10 directive information (e.g., directive values), one for each possible link, into the header.

For example, one common directive is "PUSH_NEW". If applied to a peer (e.g., peer B in FIG. 18B), this directive indicates that any time this bucket has an object which the remote peer does not, this chapter has a responsibility to push the object to that peer. This directive would be applied whenever establishing a new Mirror of the bucket, for example, but might not be applied to a peer if the peer were going to serve as a Cache rather than a mirror (e.g., if someone creates a new object here at the origin, we might not choose to proactively push that new object to any remote buckets that are serving as caches—since instead, we would expect those caches to contact us to pull new objects as needed).

Another common directive is "PUSH_CHANGES". If applied to a peer, this directive indicates that any time an object is changed or deleted, if the peer already knows about the object then the peer should be told about the change. Most peer relationships use this directive.

A specialty directive is "DELETE_REMOTE." By applying this directive to a peer, the local chapter gains the responsibility to delete from the remote peer any objects that it has. This directive might be applied during tear-down of a mirror, for example, in expectation that the mirror should be cleaned out prior to being decommissioned.

Other directives pertain to archival (e.g., this object should be pushed to the remote mirror and then freed locally once it reaches a certain age), local cleanup or local delete (e.g., all objects should be deleted from this bucket), a namespace pull to iterate a range of the peered bucket and create object name entries there, a data pull to iterate this chapter to find unpopulated objects and GET these objects from the peer, a reclaim to iterate objects in this chapter and pull each one from a peered capacity tier, and so on.

Returning to the For Each Chapter process of FIG. 16A, this process is essentially a way for the host to perform some small amount of work on each chapter database in this bucket. In one example, an admin wants to establish a Passive Mirror out in the cloud, the admin's local bucket is plausibly starting with a lot of existing content—meaning that could very well have thousands of chapter databases. There's approximately a square-root relationship between objects in a bucket and chapter databases: if you have a million objects in a bucket, then that bucket will have roughly a thousand chapter databases where each chapter database has roughly a thousand objects. As previously mentioned, when the For Each Chapter administrative process runs, what it's looking to do is "make a quick touch to each of those chapters to leave behind some state."

In actuality, this process is writing a directive into the chapter database's "userheader" structure. This header is just a reserved space that the chapter database leaves alone in fbn 0 for callers to use. Today, the CSS chapter stores some self-identity data there for debugging and recovery. The track changes mechanism adds a little more data: an array of up to ten directives—the maximum quantity corresponding to the supported number of links this bucket can legally have. Each directive entry has a type, and enough data to approximately indicate an amount of progress for a chapter having work performed.

In the passive mirror example, the For Each Chapter process is writing a Data Push directive: a reminder that the OS needs to iterate whatever objects exist in this chapter already, and push the objects to this particular peer (being our new linked Passive Mirror). There's no real race condition involved: the moment the process added that VLDB entry, any new objects that arrive in the bucket will be picked up by the track changes mechanism in the course of regular OSP protocol service and handled.

FIG. 16B illustrates a computer implemented method performed by one or more processing resources of a distributed storage system to create an object in a distributed object storage database and adding an entry to a secondary index of a chapter database in accordance with one embodiment. In the context of the present example, The operations of computer-implemented method 1650 may be executed by a storage controller, a storage virtual machine, a multi-site distributed storage system having an OS with a change tracking manager, a storage node, a computer system, a machine, a server, a web appliance, a centralized system, a distributed node, or any system, which includes processing logic (e.g., one or more processors such as processors 1504, a processing resource). The processing logic may include hardware (circuitry, dedicated logic, etc.), software (such as is run on a general purpose computer system or a dedicated machine or a device), or a combination of both.

At operation 1652, the method includes managing storage of objects and continuously tracking changes of the objects in a distributed object storage database that includes a first database of a first type and one or more chapter databases of a second type with the distributing object storage database supporting a primary lookup index and a secondary lookup index in order to locate a record in multiple ways. At operation 1654, the method includes creating a record for an object having an object name, the object being stored in a bucket of the distributed object storage database.

At operation 1656, the method includes linking the bucket to a peer bucket based on a directive.

At operation 1658, the method includes generating a peer marker field for the record to store one peer marker of multiple different peer markers depending on a relationship between the bucket and the peer bucket. At operation 1660, the method includes automatically storing the record and adding an entry into the primary lookup index to locate the object by object name. At operation 1662, the method includes automatically adding a work item for the object to the secondary index of a chapter database based on the record being created in the bucket and the peer marker for the peer bucket.

The distributed object storage database is a flat namespace with no directories and a collection of unique filenames. Each chapter database implements a secondary index that encapsulates a work list of work items for each chapter database. Individual entries added into the secondary index are sorted first by Peer Identity and then by Object Change Time.

FIG. 18A illustrates an example of a chapter record layout 1800 in accordance with one embodiment. A chapter database belongs to only one bucket so the bucket number is implicit in records. Record primary key is the object name. Record payload conveys file handle, size, crtime, and md5 checksum for the object.

Each bucket has one or more chapter databases that collectively hold that bucket's entire list of objects, and as a rough estimate there are approximately as many chapter databases for the bucket as there are records in each one of those chapter databases. Each of those records is a straight-forward mapping: look up an object name, and it tells you the object's file handle and some of its properties—static data like its size and checksum and such. Remember, objects can't change later, so these properties aren't dynamic like they are in NAS. A chapter database might be stored on any member in the Flex Group, and the objects that it lists might likewise be on any member: the best performance is obtained when objects happen to be stored at same location as their chapters are stored. The Flex Group does work to encourage that to happen more often than not, but chapters tend to move around For example, as the chapter grow to list more and more objects, eventually a chapter will split—and when that happens, we might choose to build the two new half-as-large child databases on some other member. Anyway, the point is that while the chapter databases themselves can be the driving force behind many administrative actions (like acting on the directives), it's the records that the administrator needs to work with for the change tracking manager.

To explain how that works, there are two basic facts about a chapter database. First, the chapter database has a variable-length. In these chapter databases, the "key" field for each record is the object name—meaning we have a variable-length key, which is stored efficiently in the database. Second, the overall record size is likewise variable, independently of whether the portion that's the key is variable. Very flexible—and very easy to change, if for example we wanted to add more content into the records, or even have a database where different records use a different format or have different fields.

Enforcing the directives above requires additional state data to be tracked within the chapter database. After all, the PUSH_NEW directive means any object which exists here must also be made to exist on a remote peer . . . but looking at the record for object Foo, we must therefore be able to discern somehow whether that object has already been pushed to the named peer or not.

Therefore, the object's record within the chapter database is expanded to contain a list of "peer markers"—one marker for each configured peer bucket. A peer marker has four possible states:

"NEGATIVE" indicates that the corresponding peer does not know this object exists at all, and certainly does not have a copy of the object.

"POSITIVE" indicates that the object has definitely been pushed to the corresponding peer, and that the peer has acknowledged receipt of it. Further, POSITIVE indicates that the object has not changed in any way within this bucket.

"METADATA" means that the object was previously in state POSITIVE with respect to this peer, but that its metadata has changed locally since that time. For example, the OSP protocol allows a client to change the "OSP tags" of an object—this is just metadata associated with the object. So if an object is fully replicated to a peer, and then a client changes the tags on the object here at the primary storage node, the mechanism will move its corresponding peer marker to state METADATA to indicate that the object and correct data already exist at the peer, but that the change to the metadata has not yet been replicated.

"POSSIBLE" means that the state at the remote peer is either uncertain, or that it is known to exist at the remote peer but is in some way stale. For example, when an object is created locally and the admin decides to replicate that change to the remote bucket, the admin might never get a response from the transmission: was it received, or not? To capture this uncertainty, the peer marker for this object at that peer conveys POSSIBLE; it will transition to POSITIVE only when a successful response is obtained to such a transmission, or to NEGATIVE if deleting the object is attempted at the remote peer and then it was either deleted successfully or it never existed in the first place.

These peer markers are small, requiring a small amount (e.g., less than 10 bytes, ~6 bytes) of information for each link on each object record to convey the link identity plus the Positive/Negative/etc. state value itself. This arrangement allows each chapter to efficiently track the state of each object with respect to each peer: object "Foo" might have peer markers that convey B+,C−,D? to indicate that mirrored peer B definitely has the object, while mirrored peer C definitely does not, and that we attempted to push the object to mirrored peer D but have not yet heard confirmation of success or failure.

The change tracking manager changes fields for individual records inside a chapter database.

In one example, have an object but no local storage? This causes a file handle to be replaced with value representing "sparse." For example, to support caching and archival—which means it's possible to know that an object exists, but don't actually have a local inode holding its data (since either haven't pulled it yet, or archived it into a Capacity Tier and then deleted it from the local storage). So to be able to supplant that local file handle with some indication that the data isn't present, like writing a reserved value over the file handle field that says "sparse" in some fashion.

In another example, what happens if an object has been deleted? The file handle is replaced with value representing "deleted." A client might delete an object from this bucket entirely—but have mirrors and caches and stuff linked to the bucket, and no communication has occurred to the peers about the change yet—so for a time at least, the change tracking manager represents "not only is there no inode locally, but that's because the object has been deleted so don't expect to ever get the data back." Again, the change tracking manager can indicate this by replacing the file handle field with an even more severe reserved value conveying "deleted."

Object record gains a "change time" field: updates when object created, deleted, overwritten, etc.

Object record also gains an array of zero or more "peer marker" fields.

At most one peer marker exists for each linked peer (e.g., all linked mirrors, caches, and capacity tiers). Having a marker at all indicates the specified peer might know about this object.

Corollary: having no marker for a peer indicates that peer does not know about this object.

Each marker is a {link id, state} tuple, where "state" reflects either Partial or Complete.

Peer markers are needed due to some of these situations requiring a mechanism to track information on a per-link basis. That is, this Active Mirror might have two peered mirrors to talk with—peers A and B, who might even have different RPOs configured. When a new object arrives, we have to remember that both need to hear about the object. When enough time has passed that peer A's RPO has elapsed, the change tracking manager communicates with peer A about the new object—so now, the change tracking manager record that peer A has the object while peer B still does not. The same kind of complexity occurs when you delete an object, or if you overwrite an object with a new object of the same name. Alternatively, maybe it was a peer providing a communication about the object in the first place-in that case, the change tracking manager doesn't need to message that peer about the object since it already knows, but the change tracking manager might need to pass the knowledge on elsewhere.

To track this sort of highly granular information, the change tracking manager adds another field to the records in the chapter database—and it's an important one. The new field is an optional array of "peer markers," and at any time a record might have as few as zero peer markers in the array or it might have as many as one peer marker for each linked peer, which means up to ten peer markers, since each mirror can have up to ten links. The peer markers specify the link ID of a particular peer and then indicate either a state of Partial or Complete.

Having a peer marker at all for a linked peer indicates that this peer has some knowledge of this object. Actually, it makes more sense the other way around: if a particular link has no peer marker, then the change tracking manager knows with absolute certainty that the peer has zero knowledge of this object. If change tracking manager does have a peer marker for a particular link, then the change tracking manager checks the State field: if it indicates Partial then there's a chance that the object exists there but may not be completely sure; or it can indicate Complete in which case the change tracking manager knows with certainty that the linked peer does contain an exact, full copy of this object.

This peer marker discussion is background for the change tracking manager, which encodes the mirroring state of each object within the existing chapter databases. The point of this change tracking manager is to efficiently organize the change tracking such that turning this persistent state of "object Foo is not yet replicated to peer C" into an organized list of tasks for transmitting object Foo to peer C in a certain time period (e.g., approximately 20 minutes from now).

To accomplish this, a novel secondary index is implemented within the chapter database. A secondary index provides an alternate way to find a particular record in the database—like having a phone book that's regularly sorted by name (primary index), but which also has an appendix where entries are sorted by home address (secondary index) such that looking up the address will indicate the associated name of the person who lives there.

Importantly, a secondary index might have multiple references to the primary index: e.g., there are many people living in the same address, such that looking up that address will show several entries all referencing different names. Alternately, a secondary index might not have a reference to a particular name at all, if the primary index has no listed address for a name. Moreover, as the actual record changes, its entries along all lookup indices also change. If John Doe asked to have his name changed to James Doc, then the primary lookup index would change to provide a new lookup; if he asked to change his address to another street, then the secondary lookup index would naturally change to reflect the new reverse mapping.

In this change tracking system, each chapter database implements a secondary index that encapsulates the "worklist" for the chapter. Each record emits an entry to the secondary index for each of its peers for which it has any work due. For example, if object Foo has a linked peer bucket C that is supposed to be a mirror, but object Foo has a peer marker conveying "C–" (that is, peer C does not have this object yet), then this record would emit an entry into the secondary index that conceptually represents the need to push this object to peer C. When a record changes state, the entries that it emits (or does not emit) into the secondary index are automatically changed as well. If the record's peer state changes from C– to C+, for example, then there is no longer any work to be done for this object at this peer. C already has the object now, and so this record no longer emits a secondary index entry for this peer.

Thus, at any given time, the secondary index within a chapter database conveys all the upcoming replication work that this chapter knows is pending in some way. If one were to follow along that secondary index for all chapters and perform every step listed—changing the records to convey the updated state as work is accomplished—then eventually all mirrors would be correctly brought up to date with respect to an originating or source bucket. As a side effect, since the work has now been updated and the peer markers reflect the remote buckets' states, at the end of this process, the secondary indices would all be empty, indicating that no further work is required at least until something changes later, anyway, like a new object being created here.

In one example, individual entries emitted into the secondary index are sorted first by Peer Identity, and then by Object Change Time. Further, the entries additionally convey the computed action required. Thus, if one were to look at a chapter database and iterate across its secondary index, one would first encounter all the entries that pertain to updating mirror B, and then all the entries that pertain to updating mirror C, and so on. Within each mirror's content along this secondary index, in one example, the individual entries emitted there would appear in time-sorted order, such that objects with older change-times would have their entries listed first. Thus, one could search for the first entry on the secondary index that is listed as >={Peer C}, and would immediately discover the oldest change that needs to be transmitted to peer C.

Further, the chapter database includes in a header area the properties of the first emitted worklist entry for each peer, as well as tallies for how many worklist entries have been emitted for each peer and how much work each represents. If the object that the change tracking manager to pushes to peer C represents 10 MB of data transmission, and if this were the only work known to the chapter, then the chapter's header might convey "peer B: nothing to do; peer C: 1 task to do, collectively representing 10 MB of data to transmit, and the oldest object for transmit was modified by the client at time T."

This header of the chapter database allows the OS of a storage node to continually maintain collective tracking of the overall replication state. By loading just this header from each chapter and storing it in memory of a storage node, the OS can quickly tally up the work required to catch a particular peer up to date. The OS knows, for example, that peer C has replication that is behind schedule (because oldest-change-time T was six hours ago, versus the configured RPO of just one hour), and the change tracking manager of the OS knows that peer C has a certain number of objects that need to be transmitted (e.g., a summary of the change count for this peer from all chapters), and that doing all that transmission will require an amount of network traffic (e.g., a summary of the object sizes for all to-be-transmitted objects).

This knowledge allows the OS to quickly decide what to do first at any time. Peer C knows of a change that occurred locally 6 hours ago, but its RPO is 1 hour? Then peer C is 5 hours behind and therefore deserves priority treatment over peers D and E which are up to date. The OS can then direct our oldest-change-time chapter to start performing replication work—and when doing so, it can simply search for records >=C on the secondary index, and it will encounter the work it needs to accomplish in approximate time-to-complete order. Moreover, every node that stores chapters can independently do this work for its own chapters—allowing both change tracking and actual replication to occur in parallel with very little need to coordinate among nodes.

FIG. 19 illustrates an example of a peer marker and index table 1900 in accordance with one embodiment. Peer markers influence change tracking behavior and what work items need to be performed for a particular linked peer bucket.

In one example, a local bucket (LB) includes a chapter record for an object named "hello.txt", and that chapter record has a valid file handle. That means the object exists, and so all of our linked peers will eventually find out about it as well. Thus, for each outbound link, the change tracking manager (CTM) can make an assessment for what to do with that link based on what that link's peer marker (if any) indicates.

If there's no peer marker for a peer in peer marker field 1910—in particular, let's say it's an Active Mirror or Passive Mirror peer—then there's a problem. Having no peer marker means that our peer has no idea about this object. But it's a mirror, and the object really does exist! The change tracking manager clearly has a responsibility to push the object to that peer. Note that this compulsion really only applies if the peer is a mirror: if the peer is an Active Cache the change tracking manager doesn't necessarily want to proactively push the object, and if it's a Capacity Tier then the change tracking manager uses a different mechanism to decide if it's time to archive this file yet.

Alternatively, let's say that our linked peer does have a peer marker, and the marker says Partial. This state occurs if change tracking manager tries to do a PUT call for the object earlier, but never got a reply. Did it get through? Who knows? The change tracking managerknows there is a chance the object is there, but is not sure. So the change tracking managerretries that push until obtaining a nice clean response indicating that it was successful.

In another example, one of our peers has a peer marker for this object, and that marker says Complete. In that case, this is the state to reach, and so there's no further work for the change tracking manager to do.

The "Index?" field 1912 in this table indicates whether work items need to be performed or not. That's because the change tracking manager adds a new secondary lookup index to each chapter database: a redundant way to sort and organize records. The change tracking manager can still use the primary index to find a record by object name, no changes there—but now, for any record where a linked peer has Index?=Yes in this table, that record will emit an entry into a secondary lookup index. Thus whenever a user creates a new object in this mirror, the change tracking manager writes that record into the chapter database, then immediately the chapter database will automatically store the record and chapter database will add an entry into the primary lookup index to help find the object by name. Now, if you have four linked mirrors (for example) then the chapter database will also add four new entries into that secondary lookup index. The secondary index has a multiple-field sort function. Entries are sorted first by link ID, and second by change time—that new field added to the link record. It's this new secondary index that lets the change tracking manager organize its pending work. Each chapter database is now providing a work list, organized by link ID and with the oldest changes appearing first, pointing directly to the objects where some activity is pending. If the change tracking manager catches up—that is, if the change tracking manager managed to push all our objects to all our peers—then that secondary index will be empty because there will be no work left to do. This organization not only makes it trivial to assess how much work is left to accomplish, but also tells us exactly what needs to go next.

FIG. 20 illustrates an example of a peer marker and index table 2000 in accordance with one embodiment. For this table 2000, the record has no file handle. The record just indicates "Sparse" there instead. The Sparse state may occur in a number of ways. For example, this could be an Active Cache that has received information about the object—knows the name and such—but it hasn't actually pulled the data yet. Similarly, another example would occur if in the process of constructing an Active Mirror—say, the change tracking manager rebuilds it from a backup in the cloud and have fully enumerated the cloud bucket to know what objects are in there, but the change tracking manager hasn't pulled all the objects down yet. Alternatively, the object may exist for a while, but the change tracking manager decided it was cold and so the object is archived in a Capacity Tier. In that case, once again, no local storage exists for the object. The good news is, having a sparse file handle here doesn't really change our requirements for our peers as indicated in fields 2010 and 2012. If a particular peer has no marker, or if it has a marker but the marker says it's just Partial as indicated in field 2012, then the change tracking manager still has a responsibility to push this object to our peer. The actual push process will be harder since the change tracking manager doesn't have the data yet—the change tracking managerwill read it from whoever does have the data, in order to do the push. For this state, there will be at least one peer who does have the data. Whoever told the change tracking manager about the name—or whatever link is been scraped to get our mirror populated, or whatever Capacity Tier the change tracking manager pushed the data into—will have a marker that says Complete to indicate it has the full data.

FIG. 21 illustrates an example of a peer marker and index table 2100 in accordance with one embodiment. For this table 2100, the record indicates deleted for the file handle. An object with this name used to exist, but a client has deleted it. The table 2100 also includes the peer field 2010 and index field 2012.

Conventional object storage doesn't have anything like table 2100. Conventionally, when you delete an object, the inode has a terminated state from a defunct process and the local bucket removes the object's record from its chapter database as part of the same file system message. With this mechanism if there are any peer markers left in the record, then the local bucket can give the inode the terminated state, but the local bucket can't blow away the record yet— because having peer markers means that some of our peers potentially know about this object, and responsibility of the change tracking manager to inform the peers that the object has been deleted. The local bucket can't let the object's chapter record go away until change tracking manager takes care of that.

When the local bucket deletes an object, during the same file system message where the local bucket turns the inode into a zombie (or terminated state) and considers deleting the chapter database record entirely, if there are any peer markers at all that say Complete, then the change tracking manager immediately moves those to state Partial. The local bucket now knows that the object has been deleted—so even if a peer thinks it has the full, latest version of the object, it's wrong: the object is gone, so our peers have at best a stale copy.

Any peer markers that remain will therefore be ones that say Partial—conveying that yes, this peer might have this object. For each of those, the change tracking manager pushes a DELETE call—and whenever a peer responds with success, the change tracking manager removes its peer marker since the change tracking manager knows that the peer no longer has this object or, more to the point, the change tracking manager knows that it's no longer the responsibility of the local bucket to do anything else for this peer. When the change tracking manager removes the last peer marker, the change tracking manager can delete the object record itself from the chapter database.

The secondary indexing model for the chapter database has logic for tables 1900, 2000, and 2100 that can be encapsulated in a single method. Whenever the change tracking manager of the OS changes an object record inside the database—adding a record, removing one, or modifying fields in any way—the chapter database automatically calls back and requests, "should I add anything into a secondary index for this record, and if so, what?" If the answer of the local bucket changes—if the local bucket previously said Yes for a particular linked peer but now the local bucket is changing the record such that the local bucket doesn't need an entry in the secondary lookup index—then the chapter database will automatically remove the old stuff that the chapter database put in the secondary index for this record. Therefore, the work list of what items the local bucket is scheduled to send to its peers—essentially just dynamically appears as records change state.

FIG. 22A illustrates a network topology with multiple active mirrors in accordance with one embodiment.

Figures 22B, 23:
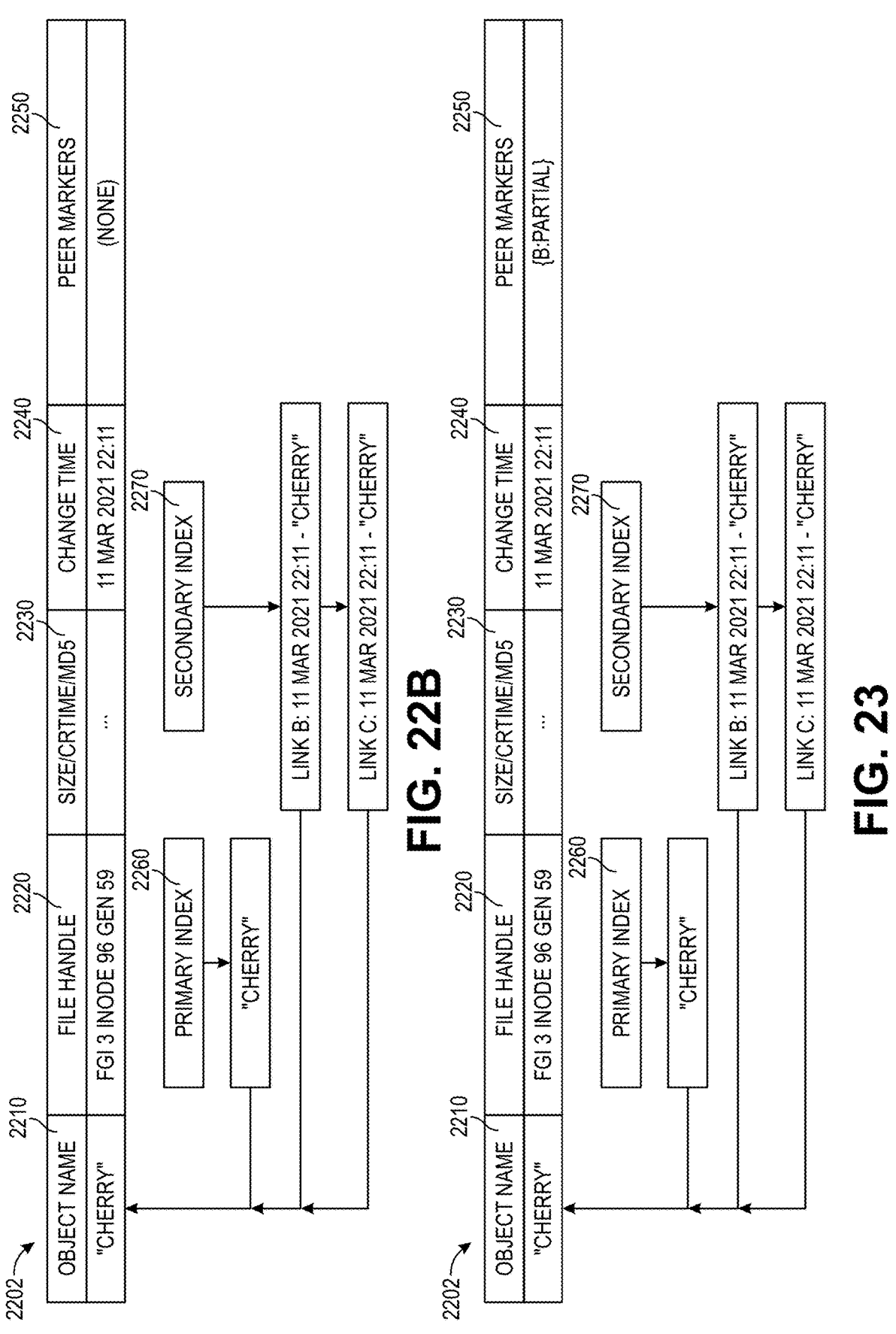
FIG. 22B illustrates an example of tracking changes for a record with the network topology of FIG. 22A that includes multiple active mirrors (e.g., active mirrors A, B, and C) in accordance with one embodiment.
FIG. 23 illustrates the record 2202 and field 2250 being modified by adding a peer marker for link B in accordance with one embodiment.

FIG. 22B illustrates an example of tracking changes for a record with the network topology of FIG. 22A that includes multiple active mirrors (e.g., active mirrors A, B, and C) in accordance with one embodiment. The record 2202 includes an object name field 2210, a file handle 2220, a size, crtime, md5 field 2230, a change time field 2240, and peer marker field 2250. In this example, a new object "Cherry" has been created by a client at mirror A. The incoming operations (e.g., create new object) are being sent from a client to active mirror A, which is linked with mirrors B and C. For this example, mirror B is scheduled for a reasonably fast RPO meaning mirror B is configured to receive any changes within ten seconds of when mirror A has changes. In contrast, mirror C has a slow RPO and mirror C is configured to receive hourly backups, so if a new object hasn't been in existence for at least an hour there's really no urgency. Initially, the buckets for each mirror are entirely empty.

A client creates object "Cherry" inside mirror A. Mirror A doesn't pause to get anyone's permission. Instead, mirror A accepts the PUT request, allocates an inode, pushes the data into the inode, and creates a record in the bucket's otherwise-empty chapter database. Since the bucket was previously empty, there will only be one chapter database for the bucket. That new record 2202 lists the object's name in field 2210, shows the file handle that the bucket allocated in field 2220, and the bucket records the object's size and checksum and so forth. Given that the OS supports the change tracking manager, the record also stores an explicit "change time" field 2240, and this field is initially set to the same value as the creation time for the object. Importantly the peer markers field 2250 is initially empty. It is empty (none) because having no peer marker for a particular linked peer is how to convey that the linked peer (e.g., mirror B, mirror C) does not know about the object. Primary index 2260 has an entry for the object name, "Cherry" and the secondary index has entries for work items for Link B and Link C of this new object, "Cherry."

In our example, link B from mirror A to mirror B has a fast RPO, so this link will be triggered first. After about ten seconds, the change tracking manager will notice that the oldest change for link B—performed on Mar. 11, 2021 at 22:11—is now far enough behind a local clock that the RPO is in danger of being violated, so it fires off a separate process to actually push that object "Cherry" to mirror B. As the transmission starts, the chapter record 2202 is changed with the peer markers field 2250 being updated to indicate that the peer might have a copy of the data. That way if something goes wrong, the record provides an indicator that an issue may exist for the peer. Thus, the record 2202 and field 2250 are modified, adding a peer marker for link B that says Partial as illustrated in FIG. 23.

Making this change to the peer marker has no impact on the indexing, since when the chapter database asks about the record, both links B and C need to be on the work list of the secondary index 2270. In this state, the transmission of the new object is performed to mirror B.

Figures 24, 25:
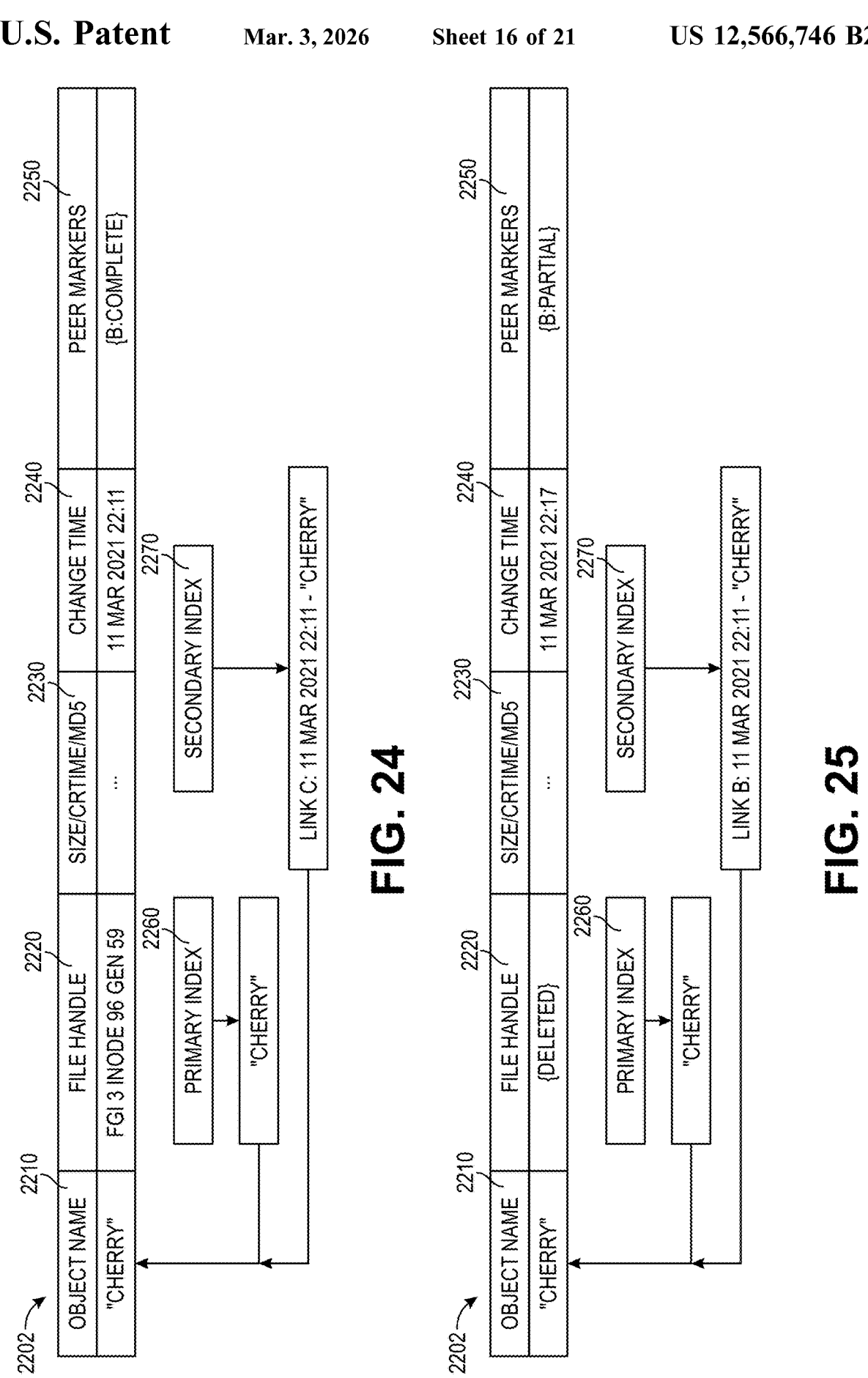
FIG. 24 illustrates that mirror B now has a copy of this object, and mirror B's peer marker is changed to indicate Complete in accordance with one embodiment.
FIG. 25 illustrates that if there are peer markers in the peer markers field, then the mechanism changes any from Complete to Partial in accordance with one embodiment.

Next, mirror A receives a response from Mirror B to acknowledge that mirror B received the PUT, processed it, and returned success. Thus, mirror B now has a copy of this object, and mirror B's peer marker is changed to indicate Complete as illustrated in FIG. 24. A brief file system message can indicate this change.

However, this time as soon as we modify the record 2202 and the chapter database asks us about whether to include it on the secondary index 2270, our answer will have changed to link B no longer needing to be emitted on the secondary index 2270 as illustrated in FIG. 24. The chapter database will internally perform a full remove of the old record and a full reinsert of the new one, which is all very fast and which essentially not only updates the record but also removes the now-undesired entry for link B from the secondary index 2270. Link C still has a work item on the secondary index though because only ten seconds has elapsed, and link C's RPO won't expire until a full hour has elapsed. In this state, the mechanism waits, with nothing urgent happening.

Nothing urgent, that is, until the client decides to delete the object "Cherry" mirror A. Just like before, when the client wants to do I/O operations the change tracking manager immediately responds, and any mirroring work is queued to be performed later. As the DELETE call arrives for object "Cherry", the matching record is searched for in the chapter database and its inode is free. At the same time, the peer markers field is analyzed. If it's empty, then the change tracking manager can immediately delete the chapter record as well, and the delete process is simply concluded. However, if there are peer markers in the peer markers field, then the mechanism changes any from Complete to Partial, like for our peer B as illustrated in field 2250 of FIG. 25 and then writing the modified record back into the chapter database. This move from Complete to Partial represents that mirror B is out of date. Mirror B knows about the object, sure, but mirror B doesn't yet know that the object is deleted. Thus work needs to be performed.

When this new record is committed into the chapter database, this causes the chapter database to determine if any changes are needed for the secondary indexing. This change of record state completely changes the work items for the secondary index 2270. Previously, link B was not listed in the secondary index, but link C was listed as a work item to be indexed, because for the RPO of 1 hour, the object would need to be pushed to mirror C.

Currently as illustrated in FIG. 25, link B is on the secondary index because the DELETE call will need to be pushed there soon. However, link C never received any messaging about the object in the first place, has no work to be performed and so a work item does not need to be on the secondary index. When this secondary index changes, the change tracking manager can briefly communicate with a local data structure to remember if work should be performed currently, and then it's back to the waiting game. In this case, waiting for a link's oldest work item to become so old that the link's RPO indicates the work item needs to be handled to avoid violating a RPO.

Figure 26:
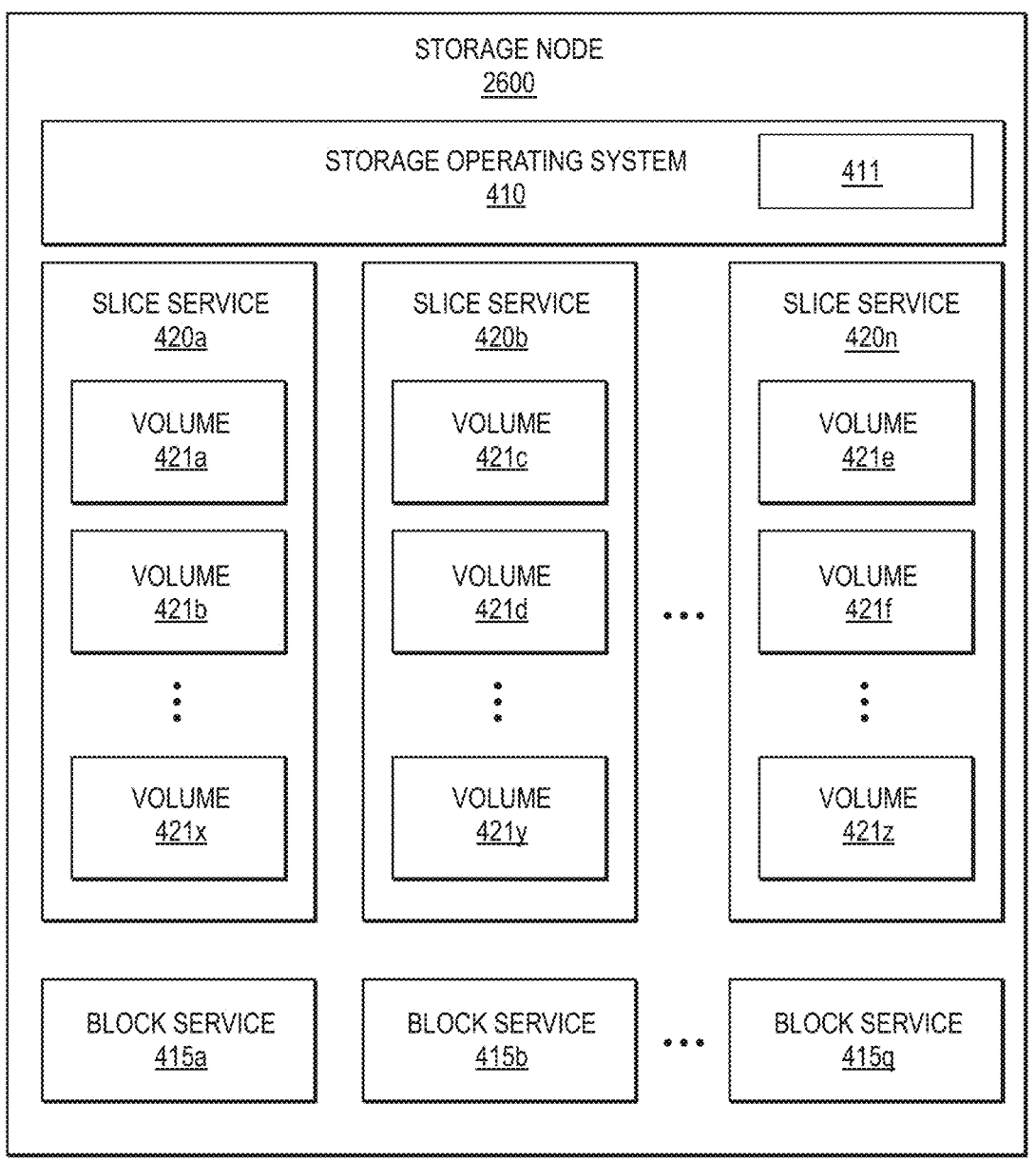
FIG. 26 is a block diagram illustrating a storage node 2600 in accordance with an embodiment of the present disclosure.

FIG. 26 is a block diagram illustrating a storage node 2600 in accordance with an embodiment of the present disclosure. Storage node 2600 represents a non-limiting example of storage nodes (e.g., 136*a-n*, 146*a-n*, etc.) described herein. In the context of the present example, storage node 2600 includes a storage operating system 410 having a change tracking mechanism or change tracking manager 411, one or more slice services 420*a-n*, and one or more block services 415*a-q*. The storage operating system (OS) 410 may provide access to data stored by the storage node 400 via various protocols (e.g., object storage protocol, small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*) with each volume including one or more buckets B1, B2, B3, etc as described herein. Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 27:
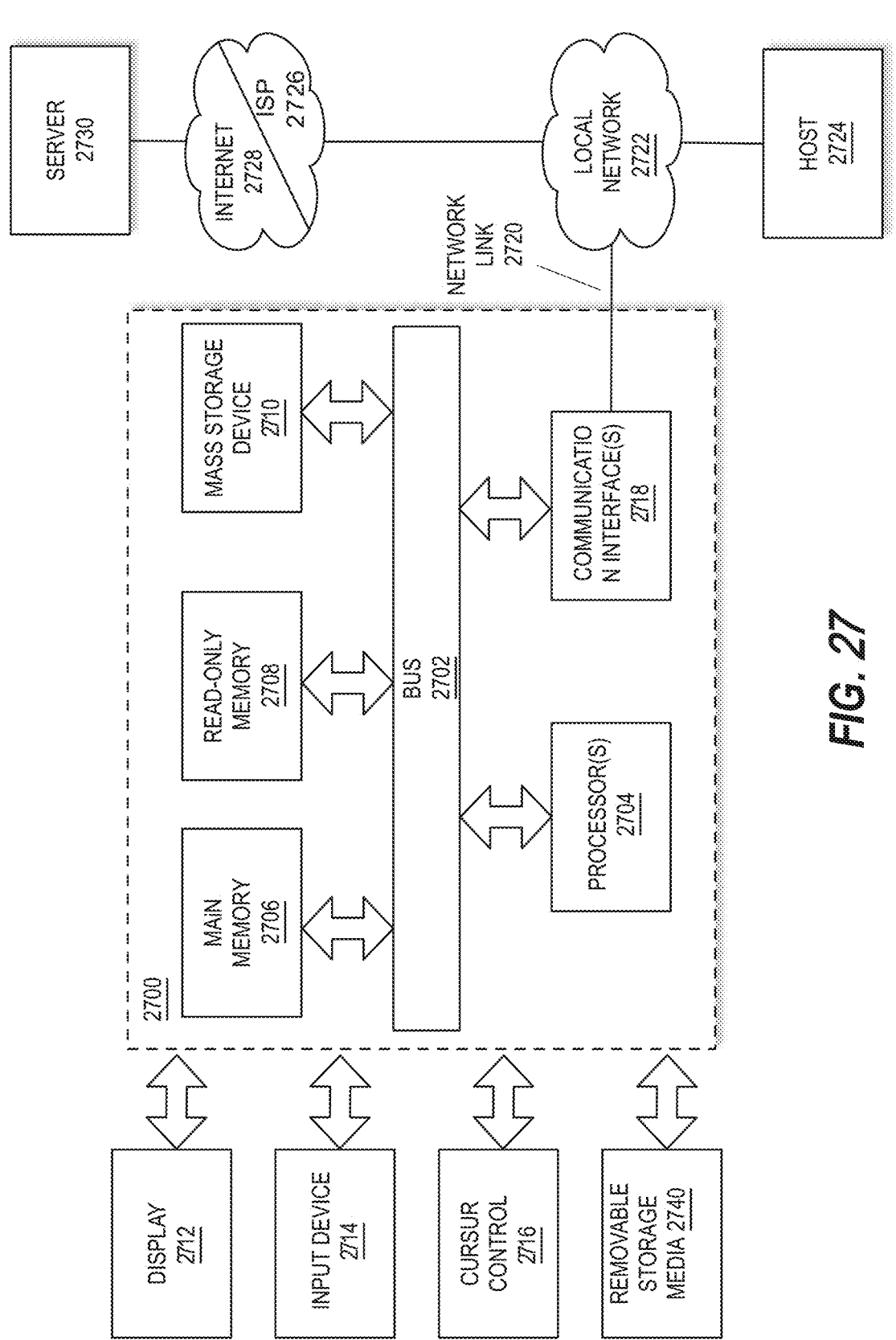
FIG. 27 illustrates an example computer system in which or with which embodiments of the present disclosure may be utilized.

FIG. 27 is a block diagram that illustrates a computer system 2700 in which or with which an embodiment of the present disclosure may be implemented. Computer system 2700 may be representative of all or a portion of the computing resources associated with a node (e.g., storage nodes 136a-n or storage nodes 146a-n) of a distributed storage system or an administrative workstation (e.g., computer system 110). Notably, components of computer system 2700 described herein are meant only to exemplify various possibilities. In no way should example computer system 2700 limit the scope of the present disclosure. In the context of the present example, computer system 2700 includes a bus 2702 or other communication mechanism for communicating information, and a processing resource (e.g., a hardware processor 2704) coupled with bus 2702 for processing information. Hardware processor 2704 may be, for example, a general purpose microprocessor.

Computer system 2700 also includes a main memory 2706, such as a random access memory (RAM) or other dynamic storage device, coupled to bus 2702 for storing information and instructions to be executed by processor 2704. Main memory 2706 also may be used for storing temporary variables or other intermediate information during execution of instructions to be executed by processor 2704. Such instructions, when stored in non-transitory storage media accessible to processor 2704, render computer system 2700 into a special-purpose machine that is customized to perform the operations specified in the instructions.

Computer system 2700 further includes a read only memory (ROM) 2708 or other static storage device coupled to bus 2702 for storing static information and instructions for processor 2704. A storage device 2710, e.g., a magnetic disk, optical disk or flash disk (made of flash memory chips), is provided and coupled to bus 2702 for storing information and instructions.

Computer system 2700 may be coupled via bus 2702 to a display 2712, e.g., a cathode ray tube (CRT), Liquid Crystal Display (LCD), Organic Light-Emitting Diode Display (OLED), Digital Light Processing Display (DLP) or the like, for displaying information to a computer user. An input device 2714, including alphanumeric and other keys, is coupled to bus 2702 for communicating information and command selections to processor 2704. Another type of user input device is cursor control 2716, such as a mouse, a trackball, a trackpad, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane.

Removable storage media 2740 can be any kind of external storage media, including, but not limited to, hard-drives, floppy drives, IOMEGA® Zip Drives, Compact Disc-Read Only Memory (CD-ROM), Compact Disc-Re- Writable (CD-RW), Digital Video Disk-Read Only Memory (DVD-ROM), USB flash drives and the like.

Computer system 2700 may implement the techniques described herein using customized hard-wired logic, one or more ASICs or FPGAs, firmware or program logic which in combination with the computer system causes or programs computer system 2700 to be a special-purpose machine. According to one embodiment, the techniques herein are performed by computer system 2700 in response to processor 2704 executing one or more sequences of one or more instructions contained in main memory 2706. Such instructions may be read into main memory 2706 from another storage medium, such as storage device 2710. Execution of the sequences of instructions contained in main memory 2706 causes processor 2704 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 2710. Volatile media includes dynamic memory, such as main memory 2706. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2702. Transmission media can also take the form of acoustic or light waves, such as those generated during radio-wave and infra-red data communications.

Various forms of media may be involved in carrying one or more sequences of one or more instructions to processor 2704 for execution. For example, the instructions may initially be carried on a magnetic disk or solid state drive of a remote computer. The remote computer can load the instructions into its dynamic memory and send the instructions over a telephone line using a modem. A modem local to computer system 2700 can receive the data on the telephone line and use an infra-red transmitter to convert the data to an infra-red signal. An infra-red detector can receive the data carried in the infra-red signal and appropriate circuitry can place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network (ISDN) card, cable modem, satellite modem, or a modem to provide a data communication connection to a corresponding type of telephone line. As another example, communication interface 2718 may be a local area network (LAN) card to provide a data communication connection to a compatible LAN. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider (ISP) 2726. ISP 2726 in turn provides data communication services through the world wide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are example forms of transmission media.

Computer system 2700 can send messages and receive data, including program code, through the network(s), network link 2720 and communication interface 1118. In the Internet example, a server 2730 might transmit a requested code for an application program through Internet 2728, ISP 2726, local network 2722 and communication interface 2718. The received code may be executed by processor 2704 as it is received, or stored in storage device 2710, or other non-volatile storage for later execution.

Figure 28:
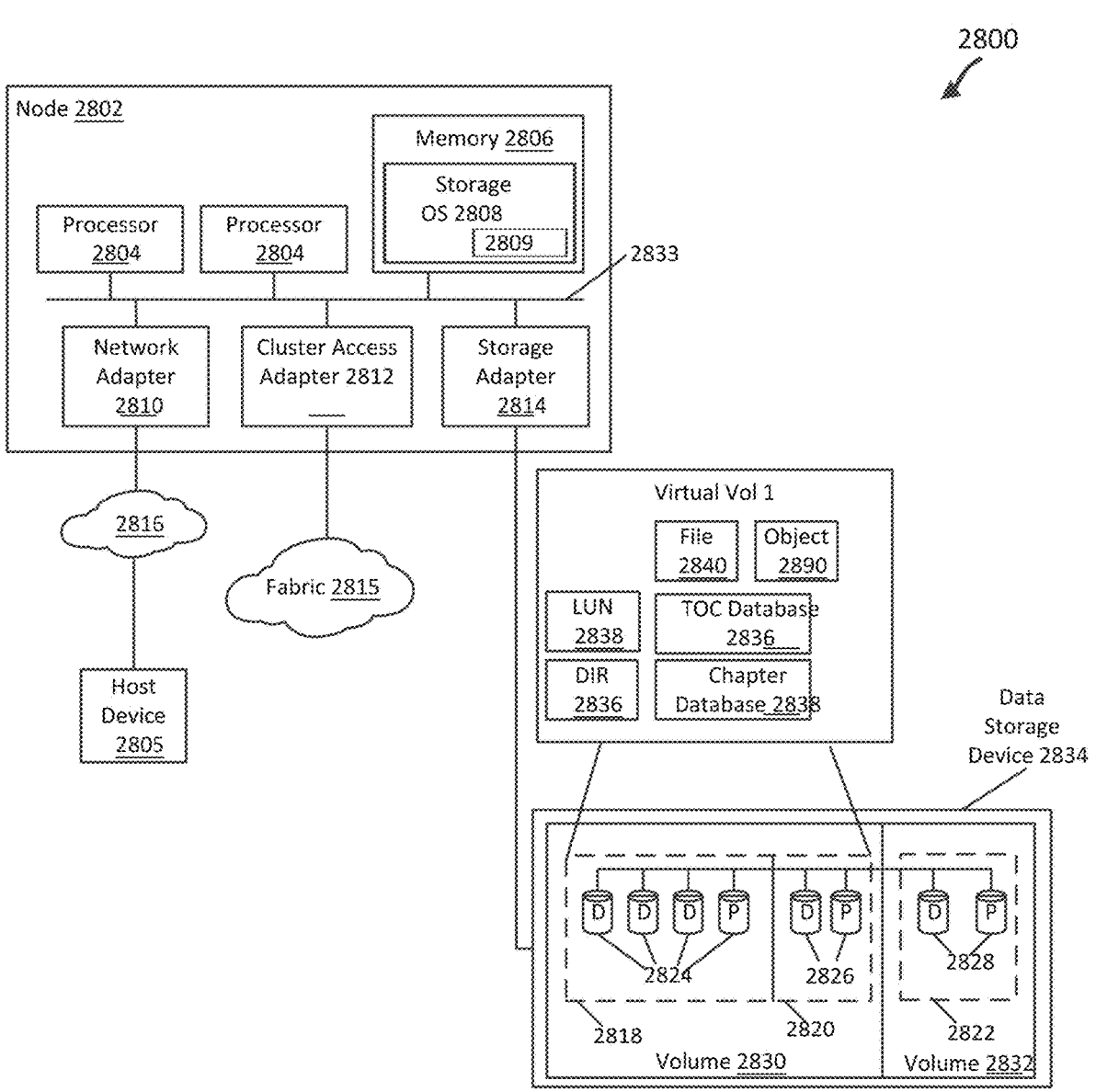
FIG. 28 is an illustrative example of a distributed storage system 2800 in accordance with one or more aspects of the present disclosure.

FIG. 28 is an illustrative example of a distributed storage system 2800, in accordance with one or more aspects of the present disclosure. The distributed storage system 2800 includes a node 2802 (e.g., nodes 136a-136n, 146a-146n, etc.), and a data storage device 2834. The node 2802 may be a general purpose computer, for example, or some other computing device particularly configured to operate as a storage server. A host device 2805 may be connected to the node 2802 over a network 2816, for example, to provide access to files and/or other data stored on the data storage device 2834. The node 2802 may include a storage controller that provides client devices, such as the host device 2805, with access to data stored within data storage device 2834.

The data storage device 2834 can include mass storage devices, such as disks 2824, 2826, 2828 of a disk array 2818, 2820, 2822. It will be appreciated that the techniques and systems, described herein, are not limited by the example illustrated in FIG. 28. For example, disks 2824, 2826, 2828 may include any type of mass storage devices, including but not limited to magnetic disk drives, flash memory (e.g., SSDs), and any other similar media adapted to store information, including, for example, data (D) and/or parity (P) information.

The node 2802 includes one or more processors 2804, a memory 2806, a network adapter 2810, a cluster access adapter 2812, and a storage adapter 2814 interconnected by a system bus 2833. The data storage system 2800 also includes an operating system 2808 installed in the Memory 2806 of the node 2802 that can, for example, implement a Redundant Array of Independent (or Inexpensive) Disks (RAID) optimization technique, or error correction coding (to name just a few examples), to optimize a reconstruction process of data of a failed disk in an array. The operating system 2808 may manage communications for the data storage system 2800, and communications between other data storage systems that may be in a clustered network, such as attached to a cluster fabric 2815. Thus, the node 2802, such as a network storage controller, can respond to host device requests to manage data on the data storage device 2834 (e.g., or additional clustered devices) in accordance with these host device requests.

The operating system 2808 may include several modules or "layers" executed by one or both of the network adapter 2810 or the storage adapter 2814. These layers may include a file system 2840 that keeps track of objects and object namespaces stored in the storage devices and manages read/write operations (e.g., executes read/write operations on storage in response to client requests). The operating system 2808 may include a change tracking mechanism 2809 (or change tracking manager) as described in the present disclosure. The operating system 2808 may establish one or more file systems on the data storage system 2800, where a file system can include software code and data structures that implement a persistent namespace of files and directories, for example. The file system may logically organize stored information as a non-hierarchical structure for files/directories/objects at the storage devices. Each "on disk" file may be implemented as a set of blocks configured to store information, such as text. These data blocks may be organized within a volume block number (VBN) space that is maintained by one or more databases accessible by the storage operating system 2808. The file system may also assign each data block in the file a corresponding "file offset" or a file block number (FBN). The file system may assign sequences of FBNs on a per-file basis, whereas VBNs may be assigned over a larger volume address space. The file system may organize the data blocks within the VBN space as a logical volume. The file system may be composed of a contiguous range of VBNs from zero to n, for a file system of size n−1 blocks, where n is a number greater than 1. In an example, when a new data storage device (not shown) is added to a clustered network system, the operating system 2808 is informed where, in an existing directory tree, new files associated with the new data storage device are to be stored. This is often referred to as "mounting" a file system.

In the example data storage system 2800, memory 2806 may include storage locations that are addressable by the processors 2804 and network adapter 2810, cluster access adapter 2812, and/or storage adapter 2814 for storing related software application code and data structures. The processors 2804, the network adapter 2810, the cluster access adapter 2812, and/or the storage adapter 2814 may, for example, include processing elements and/or logic circuitry configured to execute the software code and manipulate the data structures. The operating system 2808, portions of which are typically resident in the memory 2806 and executed by the processing elements, functionally organizes the storage system by, among other things, invoking storage operations in support of a file service implemented by the storage system. It will be apparent that other processing and memory mechanisms, including various computer readable media, may be used for storing and/or executing application instructions pertaining to the techniques described herein. For example, the operating system may also utilize one or more control files (not shown) to aid in the provisioning of virtual machines.

The network adapter 2810 includes the mechanical, electrical and signaling circuitry for connecting the data storage system 2800 to the host device 2805 over the network 2816, which may include, among other things, a point-to-point connection or a shared medium, such as a LAN. The host device 2805 may be a general-purpose computer configured to execute applications. As described above, the host device 2805 may interact with the data storage system 2800 in accordance with a client/host model of information delivery.

The storage adapter 2814 cooperates with the operating system 2808 executing on the node 2802 to access information requested by the host device 2805 (e.g., access data on a storage device managed by a network storage controller). The information may be stored on any type of attached array of writeable media such as magnetic disk drives, flash memory, and/or any other similar media adapted to store information. In the example data storage system 2800, the information may be stored in data blocks on the disks 2824, 2826, 2828. The storage adapter 2814 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information may be retrieved by the storage adapter 2814 and, in some examples, processed by the one or more processors 2804 (or the storage adapter 2814 itself) prior to being forwarded over the system bus 2842 to the network adapter 2810 (and/or the cluster access adapter 2812 if sending to another node in the cluster) where the information is formatted into a data packet and returned to the host device 2805 over the network 2816 (and/or returned to another node attached to the cluster over the cluster fabric 215).

In an embodiment, storage of information on disk arrays 2818, 2820, 2822 can be implemented as one or more storage volumes 2830,2832 that include a cluster of disks 2824, 2826, 2828 defining an overall logical arrangement of disk space. The disks 2824, 2826, 2828 that include one or more volumes may be organized as one or more groups of RAIDs (while in other examples, error correction coding may be used). As an example, volume 2830 includes an aggregate of disk arrays 2818 and 2820, which include the cluster of disks 2824 and 2826. In an example, to facilitate access to disks 2824, 2826, 2828, the operating system 2808 may implement a file system (e.g., write anywhere file system) that logically organizes the information as a non-hierarchical structure of files on the disks. Accordingly, respective files may be implemented as a set of disk blocks configured to store information, whereas databases may be implemented to store information about the files and where they are stored.

Whatever the underlying physical configuration within this data storage system 2800, data can be stored as files within physical and/or virtual volumes, which can be associated with respective volume identifiers, such as file system identifiers (FSIDs), which can be 32-bits in length in one example. A physical volume corresponds to at least a portion of physical storage devices whose address, addressable space, location, etc. does not change, such as at least some of one or more data storage devices 2834 (e.g., a Redundant Array of Independent (or Inexpensive) Disks (RAID system)). In some examples, the location of the physical volume does not change in that the (range of) address(es) used to access it may generally remain constant. A virtual volume, in contrast, may be stored over an aggregate of disparate portions of different physical storage devices. The virtual volume may be a collection of different available portions of different physical storage device locations, such as some available space from each of the disks 2824, 2826, and/or 2828, and is not "tied" to any one particular storage device. Accordingly, a virtual volume may be said to include a layer of abstraction or virtualization, which allows it to be resized and/or flexible in some regards.

Further, a virtual volume may include one or more logical unit numbers (LUNs) 2838 and/or directories 2836. The LUNs 2838 may be characterized as constituting a virtual disk or drive upon which data within the virtual volume may be stored within the aggregate. LUNs maybe referred to as virtual drives, such that they emulate a hard drive from a general purpose computer, while they actually include data blocks stored in various parts of a volume.

One or more data storage devices 2834 may have one or more physical ports, where each physical port may be assigned a target address (e.g., SCSI target address). To represent respective volumes stored on a data storage device, a target address on the data storage device 2834 may be used to identify one or more LUNs 2838. For example, when the node 2802 connects to a volume 2830,2832 through the storage adapter 2814, a connection between the node 2802 and the one or more LUNs 2838 underlying the volume is created. Additionally or alternatively, respective target addresses may identify multiple LUNs, such that a target address may represent multiple volumes. The I/O interface, which may be implemented as circuitry and/or software in the storage adapter 2814 or as executable code residing in memory 2806 and executed by the processors 2804, for example, may connect to volume 2830 by using one or more addresses that identify the one or more LUNs 2838.

An object storage system may include the data storage system 2800, which may be part of the clustered network environment 100. A volume may have a plurality of inodes, where each inode may be associated with a plurality of storage blocks. If an object is created and stored in the object storage system, the node 2802 may store the object across one or more blocks. An inode may reference or point to the actual object data by referencing or pointing to the one or more blocks storing the object. An inode may be uniquely identified in the clustered network environment 100 by its file handle, which may be composed of a volume identifier that identifies a volume and an inode number within the volume. The file handle may include a generation number field that indicates how many times this particular inode has been consumed. An inode may be consumed and then freed, and then consumed again for a new purpose. Each time an inode is reused, the generation number may be increased. Accordingly, if a host device attempts to access an object using a stale generation number, then the access request may fail.

The object storage system may include a database of a first type and one or more databases of a second type. The database of the first type may be a TOC database, and a database of the second type may be a chapter database. As shown in FIG. 28, the virtual volume may store the TOC database 2836, the chapter database 2838, and/or one or more objects 2890. The TOC database may provide an overview of the number of chapter databases in a collection of chapter databases and the location of these chapter databases. For example, the TOC database may store one or more entries or records, each record including a name marker and a chapter database file handle. The name marker may indicate a range of object names covered by a given chapter database, and the chapter database file handle may reference a location at which the chapter database is stored. Additionally, the chapter databases may store one or more entries or records, each record including an object name and an object file handle. The object name may identify an object, and the object file handle may reference a location at which the object is stored.

A chapter database may cover a discrete and continuous range of object names. A chapter database that covers a range of object names may also be referred to as a chapter database that owns, is responsible for, or includes the range of object names. In an example, if an object name is within the flat object storage namespace, exactly one chapter owns the object name. In other words, there may be a one-to-one relationship between an object name and a chapter database. If the chapter database includes an object name, then the chapter database may store a reference to a location at which the object identified by the object name is stored. In some examples, the flat object storage namespace includes an object name and the data corresponding to the object name is not accessible via the disk module. For example, the data may be archived off-site or is using a shared single-instance-storage with other content elsewhere.

A chapter database that covers an object name may not necessarily include the object name. For example, the chapter database may cover the range of object names "A-G," but not include an object name that falls within this range and is requested by a host device. In this example, the object having the object name has not yet been created and saved in the object storage system or is identified by a different object name. The collection of chapter databases serves the overall workload for maintaining (e.g., creating, reading from, writing to, destroying, and the like) objects and their object names. For example, the collection of chapter databases may include an ordered enumeration of all object names within the flat object storage namespace. If the collection of chapter databases were to be concatenated and laid out semantically from beginning to end, the collection of chapter databases would represent the entire object namespace.

The decision of where to store a chapter database may have long-term ramifications on the object storage system. For example, if the object manager stores a chapter database at a particular volume, that particular volume may receive more traffic compared to before the chapter database was stored at the particular volume. The object manager may perform operations that include looking up an object name in the namespace and then reading data from the corresponding object. Such operations may be accomplished quicker if the chapter database covering the range of object names including the object's name and the object were stored at the same volume. For example, a chapter database may reside at a first volume, and the object manager may determine that, upon looking up the desired object name, the object is stored at a second volume different from the first volume. In this example, performing the operation may result in an additional latency compared to if the chapter database and the object were to reside at the same volume. The completion time for performing an operation that involves referencing multiple volumes as part of a single task may be longer than for performing same-volume operations.

The object manager may estimate the probability of a particular object being on the same volume as its corresponding chapter database. As a chapter database splits into two and/or merges with another chapter database, the collective namespace responsibility may flow from one volume to another volume. For example, a disk module may receive a rush of new "Aardvark-" related objects to store in an initial chapter database responsible for all "A-" object names. After the disk module performs some number of new object-create actions (and allocating inodes from the chapter database's own local volume for each one), the object manager may determine to split the chapter database into two partitioned chapter databases. The object manager may store a first one of the two partitioned chapter databases at the chapter database's local volume and may store a second one of the two partitioned chapter databases at a volume different from the chapter database's local volume. Accordingly, about half of the names in the Aardvark-filled chapter database may be stored in the second partitioned database that differs from where its objects were allocated, while the object names in the first new partitioned database may still be co-located on this volume. In this example, about half of the objects identified by the object names are "local" to the chapter database and about half of the objects identified by the object names are "remote" from the chapter database.

Additionally, each of the two new partitioned chapter databases may be only half-full of object names and ready to accept new Aardvark-related names from the host device 2805 (or any other host device). If the pattern continues and the host device 2805 (or any other host device) writes more Aardvark-related names, then each of the two new partitioned chapter database may accept a flood of new names in the namespace. In some examples, the object manager 160 may allocate new inodes that are local to a particular chapter database. If both partitioned chapter databases receive new object names in this namespace evenly and they each grow to a point where the object manager 160 determines that they should be split again, the first chapter database (the chapter database that is local to the original objects) may have one hundred percent local object names, and the second chapter database (the chapter database that is remote from the original objects) may have approximately fifty percent local object names. The collective result may be that seventy-five percent (an average of the one hundred percent local object names and the fifty percent local object names) of the objects in this storage container may, at this moment, be stored on the same volume as their corresponding portion of the namespace. This pattern may continue and provide approximately a two-thirds locality for objects.

Figure 29:
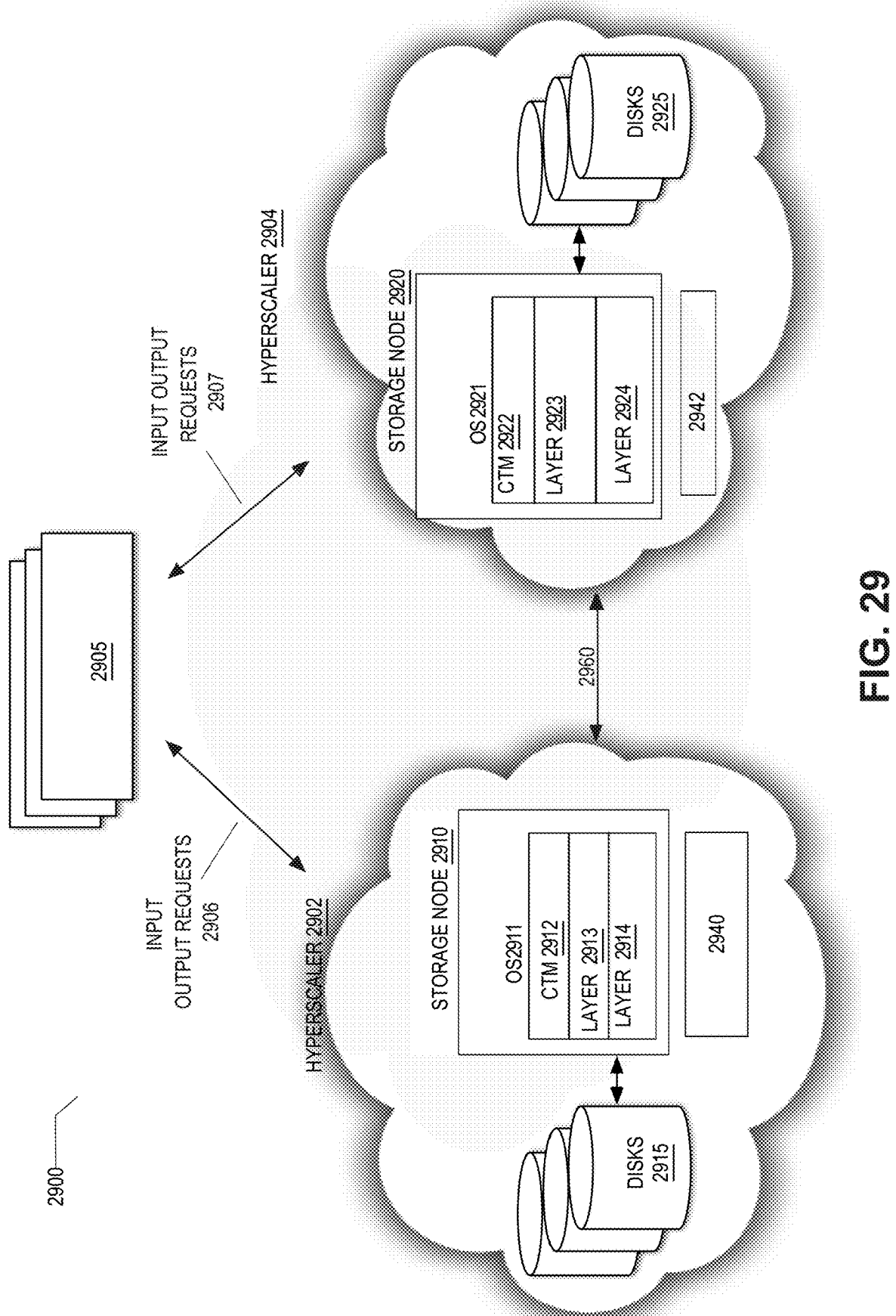
FIG. 29 is a block diagram illustrating a cloud environment in which various embodiments may be implemented.

FIG. 29 is a block diagram illustrating a cloud environment in which various embodiments may be implemented. In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having a change tracking manager 1412 and layers 2913 and 2914 of a protocol stack for processing of object storage protocol operations or requests.

The layers 2913 and 2914 correspond to the layers 1410 and 1420 of the protocol stack 1400 of FIG. 14.

The virtual storage node 2920 includes an operating system 2921 having a change tracking manager 2922 and layers 2923 and 2924 of a protocol stack for processing of object storage protocol operations or requests.

The storage nodes can include storage device drivers for transmission of messages and data via the one or more links 1460. The storage device drivers interact with the various types of hyperscale disks 1415, 1425 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

FIG. 30 illustrates a computer implemented method performed by one or more processing resources of a distributed storage system to integrate change tracking of storage objects into a distributed object storage database of the distributed storage system in accordance with one embodiment. In the context of the present example, The operations of computer-implemented method 3050 may be executed by a storage controller, a storage virtual machine, a multi-site distributed storage system having an OS with a change tracking manager, a storage node, a computer system, a machine, a server, a web appliance, a centralized system, a distributed node, or any system, which includes processing logic (e.g., one or more processors such as processors 2704, 2804, a processing resource). The processing logic may include hardware (circuitry, dedicated logic, etc.), software (such as is run on a general purpose computer system or a dedicated machine or a device), or a combination of both.

At operation 3002, the method includes integrating change tracking of storage objects into the distributed object storage database that includes a first database of a first type and one or more chapter databases of a second type with the distributed object storage database supporting a primary lookup index and a secondary lookup index in order to locate a storage object. The distributed object storage database continuously tracks changes of the storage objects that are stored in the distributed object storage database without using a separate transaction log database At operation 3004, the method includes recording in a header of a chapter database a network topology for connecting a bucket having the chapter database to a first peer bucket when a new mirror to the first peer bucket is being established and at operation 3006 recording a first directive into the header of the chapter database to express a type of content to be mirrored from the bucket to the first peer bucket.

In one example, the header includes an array of multiple directives for describing pending work items to one or more peer buckets. The header can be a reserved space of less than 10 kilobits in the chapter database.

At operation 3008, the method includes recording a second directive into the header of the chapter database to express a type of content to be cached from the bucket to a second peer bucket and recording a third directive into the header of the chapter database to express a type of content to be archived from the bucket to a third peer bucket.

At operation 3010, the method includes sorting the pending work items in the header of each chapter database based on urgency of performing a work item.

At operation 3012, the method includes continuously updating the header of each chapter database to determine which chapter databases among a large number of chapter databases within the bucket having urgent pending work items based on a recovery point objective (RPO) and performing the urgent pending work items based on the RPO.

In one embodiment, distributed data storage systems and methods are described for integrating a change tracking manager with scalable databases. According to some embodiments for Example 1, a computer implemented method performed by one or more processing resources of a distributed storage system comprises managing storage of objects and continuously tracking changes of the objects in a distributed object storage database that includes a first database of a first type and one or more chapter databases of a second type with the distributed object storage database supporting a primary lookup index and a secondary lookup index in order to locate a record, creating a record for an object having an object name, the object being stored in a bucket of the distributed object storage database of the distributed storage system, linking the bucket to a peer bucket based on a directive, generating a peer marker field for the record to store one peer marker of multiple different peer markers depending on a relationship between the bucket and the peer bucket, and automatically adding a work item for the object to the secondary lookup index of a chapter database based on the record being created in the bucket and the peer marker for the peer bucket.

Example 2 includes the subject matter of Example 1, wherein the distributed object storage database is a flat namespace database with no directories and a collection of unique filenames, wherein the distributed object storage database continuously tracks changes of the objects that are stored in the distributed object storage database without using a separate transaction log database.

Example 3 includes the subject matter of any of Examples 1-2, wherein each chapter database implements the secondary lookup index that encapsulates a work list of work items for each chapter database.

Example 4 includes the subject matter of any of Examples 1-3, wherein individual entries added into the secondary lookup index are sorted first by peer identity and then by object change time.

Example 5 includes the subject matter of any of Examples 1-4, the method further comprises automatically storing the record and adding an entry into the primary lookup index to locate the object by object name.

Example 6 includes the subject matter of any of Examples 1-5, wherein the directive comprises a push new directive to push a new object from the bucket to the peer bucket, a push changes directive to push changes to an object from the bucket to the peer bucket, a delete remote directive, or an archival directive.

Example 7 includes the subject matter of any of Examples 1-6, wherein the bucket is configured to track its relationships with peer buckets, to determine when to push objects to peered buckets, and to determine data to be pulled from peer buckets in order to provide an independent storage policy on a granularity of a bucket.

Some embodiments relate to Example 8 that includes a storage node comprising a processing resource and a non-transitory computer-readable medium coupled to the processing resource, having stored therein instructions, which when executed by the processing resource cause the processing resource to manage storage of objects and continuously track changes of the objects in a distributed object storage database that includes a first database and one or more chapter databases with the distributed object storage database supporting a primary lookup index and a secondary lookup index in order to locate a record, create a record for an object having an object name, the object being stored in a bucket of the distributed object storage database, link the bucket to a peer bucket based on a directive, generate a peer marker field for the record to store one peer marker of multiple different peer markers depending on a relationship between the bucket and the peer bucket, and automatically add a work item for the object to the secondary lookup index of a chapter database based on the record being created in the bucket and the peer marker for the peer bucket.

Example 9 includes the subject matter of Example 8, wherein the distributed object storage database is a flat namespace database with no directories and a collection of unique filenames, wherein the distributed object storage database continuously tracks changes of the objects that are stored in the distributed object storage database without using a separate transaction log database.

Example 10 includes the subject matter of any of Examples 8-9, wherein each chapter database implements the secondary lookup index that encapsulates a work list of work items for each chapter database.

Example 11 includes the subject matter of any of Examples 8-10, wherein individual entries added into the secondary lookup index are sorted first by peer identity and then by object change time.

Example 12 includes the subject matter of any of Examples 8-11, wherein the processing resource is configured to execute instructions to automatically store the record and add an entry into the primary lookup index to locate the object by object name.

Example 13 includes the subject matter of any of Examples 8-12, wherein the processing resource is configured to execute instructions to expand the record of the object within the chapter database to include a list of peer markers with a peer marker for each configured peer bucket.

Example 14 includes the subject matter of any of Examples 8-13, wherein the peer marker comprises a negative state to indicate that a corresponding peer bucket does not know that the object exists at all, and does not have a copy of the object.

Example 15 includes the subject matter of any of Examples 8-14, wherein the peer marker comprises a positive state to indicate that the object has been pushed to the corresponding peer bucket, and that the peer bucket has acknowledged receipt of the object.

Example 16 includes the subject matter of any of Examples 8-15, wherein the peer marker comprises a metadata state to indicate that the object was previously in the positive state with respect to this peer, and the metadata has changed locally at the bucket since a time of the positive state.

Some embodiments relate to Example 17 that includes a non-transitory computer-readable storage medium embodying a set of instructions, which when executed by a processing resource of a distributed storage system cause the processing resource to manage storage of objects and continuously track changes of the objects in a distributed object storage database of the distributed storage system that includes a first database of a first type and one or more chapter databases of a second type with the distributed object storage database supporting a primary lookup index and a secondary lookup index in order to locate a record, create a record for an object having an object name, the object being stored in a bucket of the distributed object storage database, link the bucket to a peer bucket based on a directive, generate a peer marker field for the record to store one peer marker of multiple different peer markers depending on a relationship between the bucket and the peer bucket, and automatically add a work item for the object to the secondary lookup index of a chapter database based on the record being created in the bucket and the peer marker for the peer bucket.

Example 18 includes the subject matter of Example 17, wherein the distributed object storage database is a flat namespace database with no directories and a collection of unique filenames, wherein each chapter database implements the secondary lookup index that encapsulates a work list of work items for each chapter database.

Example 19 includes the subject matter of any of Examples 17-18, wherein individual entries added into the secondary lookup index are sorted first by peer identity and then by object change time.

Example 20 includes the subject matter of any of Examples 17-19, wherein each peer marker indicates a link identity and peer state to allow each chapter database to efficiently track the peer state of each object with respect to each peer.

Some embodiments relate to Example 21 that includes a computer implemented method performed by one or more processing resources of a distributed object storage database, the method comprises integrating change tracking of storage objects into the distributed object storage database that includes a first database of a first type and one or more chapter databases of a second type with the distributed object storage database supporting a primary lookup index and a secondary lookup index in order to locate a storage object, recording in a header of a chapter database a network topology for connecting a bucket having the chapter database to a first peer bucket when a new mirror to the first peer bucket is being established, and recording a first directive into the header of the chapter database to express a type of content to be mirrored from the bucket to the first peer bucket.

Example 22 includes the subject matter of Example 21, wherein the header includes an array of multiple directives for describing pending work items to one or more peer buckets.

Example 23 includes the subject matter of any of Examples 21-22, the method further comprises recording a second directive into the header of the chapter database to express a type of content to be cached from the bucket to a second peer bucket, and recording a third directive into the header of the chapter database to express a type of content to be archived from the bucket to a third peer bucket.

Example 24 includes the subject matter of any of Examples 21-23, wherein the distributed object storage database continuously tracks changes of the storage objects that are stored in the distributed object storage database without using a separate transaction log database Example 25 includes the subject matter of any of Examples 21-24, wherein the header is a reserved space of less than 10 kilobits in the chapter database.

Example 26 includes the subject matter of any of Examples 21-25, further comprises sorting the pending work items in the header of each chapter database based on urgency of performing a work item.

Example 27 includes the subject matter of any of Examples 21-26, the method further comprises updating the header of each chapter database to determine which chapter databases among a large number of chapter databases within the bucket having urgent pending work items based on a recovery point objective (RPO), and performing the urgent pending work items based on the RPO.

Some embodiments relate to Example 28 that includes a storage node comprising one or more processing resources, and a non-transitory computer-readable medium coupled to the processing resource, having stored therein instructions, which when executed by the one or more processing resources cause the one or more processing resources to manage storage objects and continuously track changes of the storage objects in a distributed object storage database that includes one or more chapter databases with the distributed object storage database supporting a primary lookup index and a secondary lookup index in order to locate a record, generate a chapter database header for each chapter database to provide a persistent summary of pending work items to be performed, and update the chapter database header when work items are updated for the chapter database.

Example 29 includes the subject matter of Example 28, wherein the processing resource is configured to execute instructions to record a network topology for a link between a first bucket and a mirrored second bucket of the distributed object storage database in the chapter database header for the first bucket when a new mirror is established to the second bucket.

Example 30 includes the subject matter of any of Examples 28-29, wherein the one or more processing resources is configured to execute instructions to add directive information into the chapter database header for a first bucket for each link from the first bucket to one or more peer buckets of the distributed object storage database.

Example 31 includes the subject matter of any of Examples 28-30, wherein each chapter database of the distributed object storage database to independently record its own state regarding which peer buckets are to be updated and to provide semantics for each peer link for caching, for archival, for mirroring, or for migration, wherein the distributed object storage database continuously tracks changes of the storage objects that are stored in the distributed object storage database without using a separate transaction log database.

Example 32 includes the subject matter of any of Examples 28-31, wherein the one or more processing resources is configured to execute instructions to sort the pending work items in the header of each chapter database based on urgency of performing a work item.

Example 33 includes the subject matter of any of Examples 28-32, wherein the one or more processing resources is configured to execute instructions to update the header of each chapter database to determine which chapter databases among a large number of chapter databases within a first bucket have urgent pending work items based on a recovery point objective (RPO) having an intentional time-delay.

Example 34 includes the subject matter of any of Examples 28-34, wherein the one or more processing resources is configured to execute instructions to perform the urgent pending work items based on the RPO having the intentional time-delay, and delay the non-urgent pending work items based on the RPO to eliminate processing of pending work items that are transient in existing a shorter time period than the intentional time-delay of the RPO.

Some embodiments relate to Example 35 that includes a non-transitory computer-readable storage medium embodying a set of instructions, which when executed by one or more processing resources of a distributed storage system cause the one or more processing resources to manage storage objects and continuously track changes of the storage objects in a distributed object storage database that includes one or more chapter databases with the distributed object storage database supporting a primary lookup index and a secondary lookup index in order to locate a record, record in a header of a chapter database a desired network topology for connecting a bucket having the chapter database to a peer bucket when a new mirror to the first peer bucket is being established and record a directive into the header of the chapter database to express a type of content to be mirrored from the bucket to the peer bucket.

Example 36 includes the subject matter of Example 35, wherein the one or more processing resources are configured to execute the set of instructions to update the header of the chapter database when work items are updated for the chapter database.

Example 37 includes the subject matter of any of Examples 35-36, wherein the one or more processing resources are configured to execute the set of instructions to initially assign a first processing resource to the pending work items of the header of a chapter database of the bucket and dynamically assign a second processing resource to the pending work items of the header of the chapter database of the bucket in response to changes in the pending work items of the header of the chapter database of the bucket.

Example 38 includes the subject matter of any of Examples 35-37, wherein the one or more processing resources are configured to execute the set of instructions to add directive information into the header of the chapter database for the bucket for each link from the bucket to one or more peer buckets.

Example 39 includes the subject matter of any of Examples 35-38, wherein each chapter database to independently record its own state regarding which peer buckets are to be updated and to provide semantics for each peer link for caching, for archival, for mirroring, or for migration, wherein the distributed object storage database continuously tracks changes of the storage objects that are stored in the distributed object storage database without using a separate transaction log database.

Example 40 includes the subject matter of any of Examples 35-39, wherein the one or more processing resources are configured to execute the set of instructions to sort the pending work items in the header of each chapter database based on urgency of performing a work item.

What is claimed is:

1. A computer implemented method performed by one or more processing resources of a distributed object storage database, the method comprising:

integrating change tracking of storage objects into the distributed object storage database that includes a first database of a first type and one or more chapter databases of a second type with the distributed object storage database supporting a primary lookup index that is sorted by name of storage objects and a secondary lookup index for each chapter database that includes pending work items to be sorted by a peer identity in order to locate a storage object;

recording an array of multiple directives into a header of a chapter database to describe pending work items from a bucket to one or more peer buckets to allow continual collective tracking of an overall replication state from the bucket to one or more peer buckets; and sorting the pending work items in the header of each chapter database based on urgency of performing each pending work item and a recovery point objective (RPO) for each peer bucket to prioritize urgent pending work items.

2. The computer implemented method of claim 1, further comprising:

recording a first directive into the header of the chapter database to express a type of content to be mirrored from the bucket to a first peer bucket;

recording a second directive into the header of the chapter database to express a type of content to be cached from the bucket to a second peer bucket; and recording a third directive into the header of the chapter database to express a type of content to be archived from the bucket to a third peer bucket.

3. The computer implemented method of claim 1, wherein the distributed object storage database continuously tracks changes of the storage objects that are stored in the distributed object storage database without using a separate transaction log database.

4. The computer implemented method of claim 1, wherein the header is a reserved space of less than 10 kilobits in the chapter database.

5. The computer implemented method of claim 1, further comprising:

recording in a header of a chapter database a network topology for connecting a bucket having the chapter database to a first peer bucket when a new mirror to the first peer bucket is being established.

6. The computer implemented method of claim 1, further comprising:

updating the header of each chapter database to determine which chapter databases among a large number of chapter databases within the bucket having urgent pending work items based on a recovery point objective (RPO); and performing the urgent pending work items based on the RPO.

7. A storage node comprising:

one or more processing resources; and a non-transitory computer-readable medium coupled to the processing resource, having stored therein instructions, which when executed by the one or more processing resources cause the one or more processing resources to:

manage storage objects and continuously track changes of the storage objects in a distributed object storage database that includes one or more chapter databases with the distributed object storage database supporting a primary lookup index and a secondary lookup index for each chapter database that includes pending work items to be sorted by a peer identity in order to locate a record;

generate a chapter database header for each chapter database to provide a summary of pending work items to be performed;

recording an array of multiple directives into a header of a chapter database to describe pending work items from a bucket to one or more peer buckets to allow continual collective tracking of an overall replication state from the bucket to one or more peer buckets;

sorting the pending work items in the header based on urgency of performing each pending work item and a recovery point objective (RPO) for each peer bucket to prioritize urgent pending work items; and update the chapter database header when work items are updated for the chapter database.

8. The storage node of claim 7, wherein the processing resource is configured to execute instructions to:

record a network topology for a link between a first bucket and a mirrored second bucket of the distributed object storage database in the chapter database header for the first bucket when a new mirror is established to the second bucket.

9. The storage node of claim 7, wherein the one or more processing resources is configured to execute instructions to:

add directive information into the chapter database header for a first bucket for each link from the first bucket to one or more peer buckets of the distributed object storage database.

10. The storage node of claim 7, wherein each chapter database of the distributed object storage database to independently record its own state regarding which peer buckets are to be updated and to provide semantics for each peer link for caching, for archival, for mirroring, or for migration, wherein the distributed object storage database continuously tracks changes of the storage objects that are stored in the distributed object storage database without using a separate transaction log database.

11. The storage node of claim 7, wherein the one or more processing resources is configured to execute instructions to:

update the header of each chapter database to determine which chapter databases among a large number of chapter databases within a first bucket having urgent pending work items based on a recovery point objective (RPO) having an intentional time-delay.

12. The storage node of claim 11, wherein the one or more processing resources is configured to execute instructions to:

perform the urgent pending work items based on the RPO having the intentional time-delay; and delay the non-urgent pending work items based on the RPO to eliminate processing of pending work items that are transient in existing a shorter time period than the intentional time-delay of the RPO.

13. A non-transitory computer-readable storage medium embodying a set of instructions, which when executed by one or more processing resources of a distributed storage system cause the one or more processing resources to:

manage storage objects and continuously track changes of the storage objects in a distributed object storage database that includes one or more chapter databases with the distributed object storage database supporting a primary lookup index and a secondary lookup index for each chapter database that includes pending work items to be sorted by a peer identity in order to locate a record;

recording an array of multiple directives into a header of a chapter database to describe pending work items from a bucket to one or more peer buckets to allow continual collective tracking of an overall replication state from the bucket to one or more peer buckets; and sorting the pending work items in the header based on urgency of performing each pending work item and a recovery point objective (RPO) for each peer bucket to prioritize urgent pending work items.

14. The non-transitory computer-readable storage medium of claim 13, wherein the one or more processing resources are configured to execute the set of instructions to:

update the header of the chapter database when work items are updated for the chapter database.

15. The non-transitory computer-readable storage medium of claim 13, wherein the one or more processing resources are configured to execute the set of instructions to:

initially assign a first processing resource to the pending work items of the header of a chapter database of the bucket; and dynamically assign a second processing resource to the pending work items of the header of the chapter database of the bucket in response to changes in the pending work items of the header of the chapter database of the bucket.

16. The non-transitory computer-readable storage medium of claim 13, wherein the one or more processing resources are configured to execute the set of instructions to:

add directive information into the header of the chapter database for the bucket for each link from the bucket to one or more peer buckets.

17. The non-transitory computer-readable storage medium of claim 13, wherein each chapter database to independently record its own state regarding which peer buckets are to be updated and to provide semantics for each peer link for caching, for archival, for mirroring, or for migration, wherein the distributed object storage database continuously tracks changes of the storage objects that are stored in the distributed object storage database without using a separate transaction log database.

* * * * *